(12) United States Patent
Ista

(10) Patent No.: US 12,339,505 B2
(45) Date of Patent: Jun. 24, 2025

(54) PLUGGABLE TRANSCEIVER MODULE

(71) Applicant: Pinjack International LLC, Auburn, AL (US)

(72) Inventor: Tyler A. Ista, San Rafael, CA (US)

(73) Assignee: Pinjack International LLC, Auburn, AL (US)

( * ) Notice: Subject to any disclaimer, the term of this patent is extended or adjusted under 35 U.S.C. 154(b) by 0 days.

(21) Appl. No.: 17/955,739

(22) Filed: Sep. 29, 2022

(65) Prior Publication Data

US 2024/0111108 A1 Apr. 4, 2024

(51) Int. Cl.
*H04B 10/00* (2013.01)
*G02B 6/42* (2006.01)
*H04B 10/40* (2013.01)

(52) U.S. Cl.
CPC ......... *G02B 6/4284* (2013.01); *G02B 6/4261* (2013.01); *G02B 6/4292* (2013.01); *H04B 10/40* (2013.01)

(58) Field of Classification Search
CPC .. G02B 6/4284; G02B 6/4261; G02B 6/4292; H04B 10/40
See application file for complete search history.

(56) References Cited

U.S. PATENT DOCUMENTS

| | | | | |
|---|---|---|---|---|
| 6,439,918 B1 * | 8/2002 | Togami | ................ | G02B 6/4292 439/372 |
| 6,746,264 B1 * | 6/2004 | Branch | ................ | H01R 13/633 439/352 |
| 7,066,746 B1 * | 6/2006 | Togami | ............... | H01R 13/6275 439/157 |
| 7,351,090 B1 * | 4/2008 | Moore | ............... | H01R 13/6335 361/728 |
| 7,507,111 B2 * | 3/2009 | Togami | ................ | G02B 6/4292 439/372 |
| 8,019,226 B2 * | 9/2011 | McColloch | .......... | G02B 6/4201 439/372 |
| 8,678,848 B2 * | 3/2014 | Chan | .................. | H01R 13/6335 439/372 |
| 9,929,500 B1 | 3/2018 | Ista | | |
| 2004/0033027 A1 * | 2/2004 | Pang | .................... | G02B 6/4261 385/53 |

(Continued)

*Primary Examiner* — Agustin Bello
(74) *Attorney, Agent, or Firm* — SMITH TEMPEL; Steven P. Wigmore

(57) ABSTRACT

A pluggable transceiver module comprises a spring-loaded latching/delatching mechanism comprising a release structure mechanically and a release tab. The release tab has an end disposed to be contacted by a user to move the latching/delatching mechanism between a latched position and a delatched position. Moving the latching/delatching mechanism from the latched position to the delatched position causes a distal portion of the release arm to move a locking post from a locked position in which the locking post engages a latch structure of the computer connection port to an unlocked position in which the locking post is disengaged from the latch structure of the computer connection port. The spring member biases the latching/delatching mechanism toward the latched position to prevent inadvertent delatching. The spring member and the release structure can be integrated into a single piece part.

6 Claims, 22 Drawing Sheets

(56) References Cited

U.S. PATENT DOCUMENTS

| | | | |
|---|---|---|---|
| 2005/0191013 A1* | 9/2005 | Sasaki | G02B 6/4246 |
| | | | 385/92 |
| 2007/0149005 A1* | 6/2007 | Togami | G02B 6/4292 |
| | | | 439/76.1 |
| 2008/0279510 A1* | 11/2008 | Chan | G02B 6/4292 |
| | | | 385/89 |
| 2018/0172927 A1* | 6/2018 | Song | G02B 6/26 |
| 2023/0213047 A1* | 7/2023 | Hino | F16B 1/00 |
| | | | 403/322.4 |
| 2024/0111108 A1* | 4/2024 | Ista | G02B 6/4292 |

* cited by examiner

PLUGGABLE TRANSCEIVER MODULE

TECHNICAL FIELD

The present disclosure relates generally to pluggable transceiver modules.

BACKGROUND

Computers and related peripheral equipment, as well as satellite and communication systems evolve extremely rapidly. These systems require ever increasing data transfer rates to drive the systems, such as digital signal processing, image analysis, and communications. With current data demands, optical couplers are used to transfer signals over short and long distances between computers, between two 20 circuit boards in one computer, and even between multiple chips on a single printed circuit board. The use of high-speed optical signals in place of electrical interconnections increases the achievable data transfer rate. Ethernet is an example of a wired technology that transmits data by interfacing with optical systems through a variety of media including backplanes, twisted pair cable, twinax, multimode fiber and single-mode fiber.

To achieve higher data transfer rates, the density of optical arrays must be increased. Increasing density requires smaller optical arrays and more precise axial alignment of emitter and detector in fiber connections. As a result, the mechanical connection mechanism for establishing and maintaining these precise connections are becoming more complex and increasingly important. Fiber optic connectors are therefore of great interest in the current art. As such, improvements are always welcome in the ease of manufacturing, installing, maintaining, and upgrading such connectors.

A pluggable transceiver module is an optical transceiver that typically houses both light emitting devices such as vertical cavity surface emitting lasers (VCSEL's) and light detecting devices such as photodiodes in a mechanical housing that can be removably attached to a computing device such as a circuit board or PCB. Driver and receiver circuitry modules, typically in the form of application specific integrated circuit (ASIC) chips, include driver circuitry for receiving electrical signals from one device and driving VCSEL emission in response. The ASIC chip also includes receiver circuitry for receiving signals from the photodiodes and, in response, processing said signals into an appropriate output. The combination of the VCSELs, the photodiodes, ASIC circuitry, and mechanical housing is referred to as an optical transceiver module.

One known pluggable transceiver module design is the Small Form-Factor Pluggable (SFP) transceiver module. SFP transceiver modules are available in a variety of designs. Enhanced versions of SFP transceiver modules that support higher data rates are referred to as "SFP+" transceiver modules. SFP and SFP+ transceiver modules are referred to herein collectively as "SFP-type" transceiver modules. SFP-type transceiver modules are configured to be inserted into an opening of a cage. When an SFP-type transceiver module is in a stored position in which it is engaged with a cage, or computer connection port, a latching/delatching mechanism of the module is engaged with a latching/delatching mechanism of the computer connection port. Together, the latching/delatching mechanism of the module and the latching/delatching mechanism of the computer connection port comprise a latching/delatching system for latching the module to and delatching the module from the computer connection port.

A variety of latching/delatching systems are used for this purpose. When the latching/delatching system is in the latched, or locked, position with the module disposed inside of the computer connection port, exertion of limited forces on the module, such as exertion of a strain force on an optical cable coupled to the module, should not result in the module becoming disengaged from the computer connection port. When the latching/delatching mechanism of the module is in the delatched, or unlocked, position such that the latching/delatching mechanism of the module is disengaged from the latching/delatching mechanism of the computer connection port, exertion of an appropriate force on the module housing in a direction away from the computer connection port will cause the module to be extracted from the cage.

A variety of factors can contribute to the reliability and robustness of the latching/delatching system. For example, fatigue of one or more components of the latching/delatching mechanism of the module and/or of features of the latching/delatching mechanism of the computer connection port can result in the latching/delatching system failing to lock or inadvertently unlocking, either of which can result in unintended movement of the module relative to the port and potential loss of electrical and/or optical connections. Accordingly, a need exists for a latching/delatching system for use with SFP-type transceiver modules that has greater reliability. A need also exists for a latching/delatching system for use with SFP-type transceiver modules that has greater compatibility with SFP-type module designs, that has a simpler design, that has fewer manufactured components, and that is easier to assemble and install.

SUMMARY

A pluggable transceiver module is disclosed herein that has a spring-loading latching/delatching mechanism that is robust, reliable, relatively easy to manufacture, and that prevents the module from inadvertently delatching from a cage or computer connection port. The module comprises a module body and a latching/delatching mechanism. A first end portion of the module body is configured to mate with a computer connection port. A second end portion of the module body opposite the first end portion has a module connection port configured to mate with a connector. The latching/delatching mechanism comprises a release structure mechanically coupled to the second end portion of the module body and a release tab having a first end that is mechanically coupled to at least one of the release structure and the second end of the module body. The release structure comprises a main body, a release arm and at least one spring member. A proximal portion of the release arm is coupled to the main body of the release structure. A distal portion of the release arm extends away from the main body of the release structure toward the module body. The release tab has a second end disposed to be contacted by a user to move the latching/delatching mechanism between a latched position and a delatched position. Moving the latching/delatching mechanism from the latched position to the delatched position causes the release arm to change the position of a locking post relative to a latch structure of the computer connection port from a locked position in which the locking post is engaged with the latch structure of the computer connection port to an unlocked position in which the locking post is disengaged from the latch structure of the computer connection port to allow the module body to be extracted from the computer connection port. The spring member biases the latching/delatching mechanism toward the latched position when the latching/delatching mechanism is being moved from the latched position toward the delatched position.

These and other features and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

Figure 1:
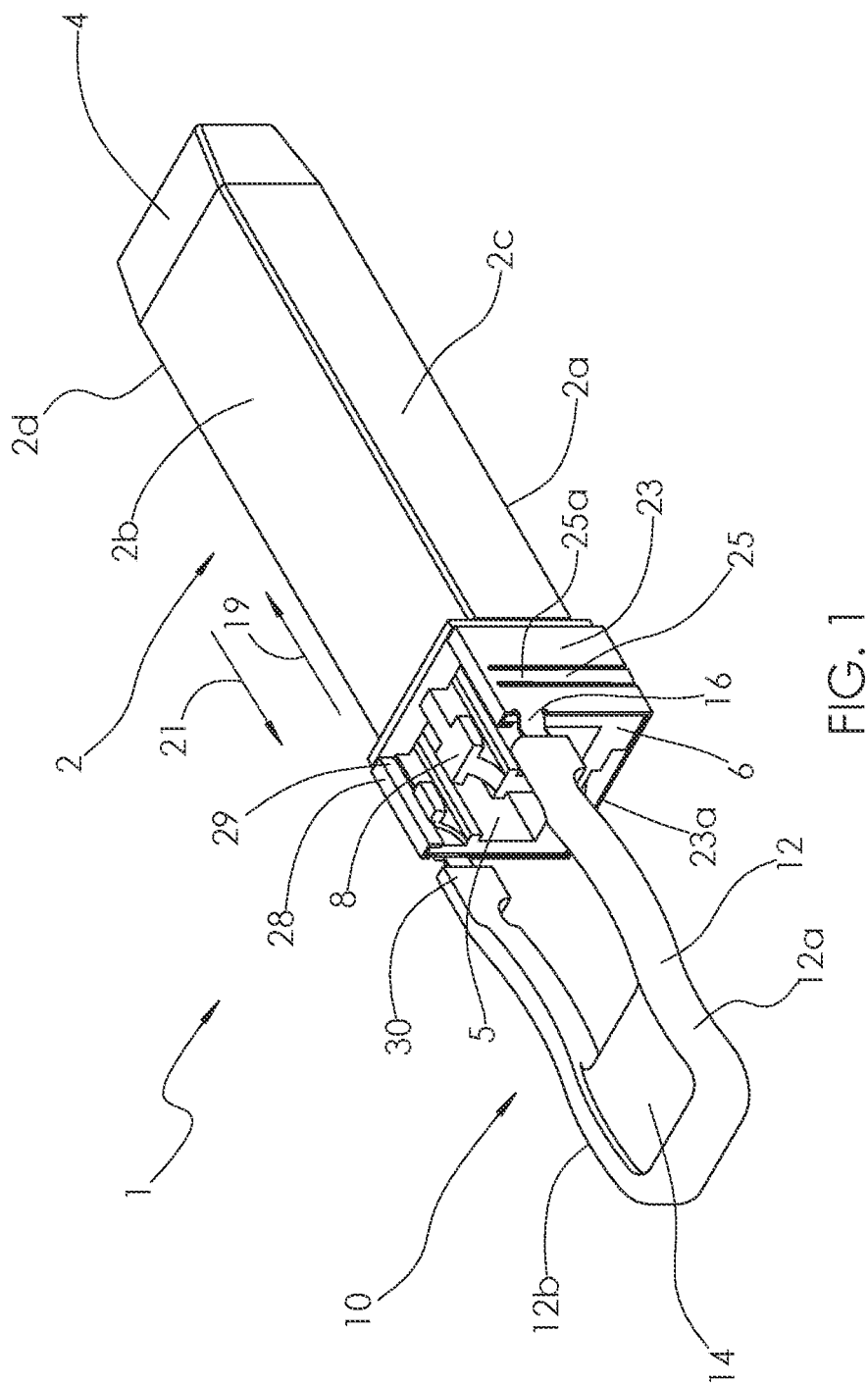
FIG. 1 is a top perspective view of a pluggable transceiver module having a latching/delatching mechanism secured to the body of the module 1 in accordance with a representative embodiment in which the latching/delatching mechanism is a pull tab-type of latching/delatching mechanism.

In the following detailed description, a few exemplary, or representative, embodiments are described to demonstrate the inventive principles and concepts. For purposes of explanation and not limitation, the representative embodiments disclose specific details in order to provide a thorough understanding of an embodiment according to the present disclosure. However, it will be understood to one having ordinary skill in the art, and having the benefit of the present disclosure, that other embodiments that depart from the specific details disclosed herein remain within the scope of the appended claims. Moreover, descriptions of well-known apparatuses and methods may be omitted to avoid obscuring the description of the representative embodiments. Such methods and apparatuses are within the scope of the present disclosure, as will be understood by those of skill in the art in view of the present disclosure.

Terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms, such as forwardly-facing, rearwardly facing, front, back, for example, may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" another element, it can be directly connected or coupled, or intervening elements may be present.

The term "pluggable transceiver module," as that term is used herein, denotes pluggable transmitter modules that only transmit signals, pluggable receiver modules that only receive signals, and pluggable transceiver modules that both transmit and receive signals. The term "pluggable transceiver module," as that term is used herein, also denotes, but is not necessarily limited to, form factor modules such as, for example, a Quad Small Form-factor Pluggable (QSFP) module, a Small Form-factor Pluggable (SFP) module, an Octal Small Form-factor Pluggable (OSFP) module, a C Form-factor Pluggable (CFP) module, and other pluggable modules that are designed to interface with many computer connection ports including QSFP type ports such as, for example, QSFP, QSFP+, QSFP14, QSFP28, QSFP56, QSFP-DD, or μQSFP, SFP type ports such as, for example, SFP, SFP+, or SFP28, Small Form Factor (SFF) casing ports, OSFP type ports, C form factor type ports (e.g., CFP, CFP2, or CFP4), or other computer connection ports configured for at least one of wired, wireless, electrical, or optical links. The computer connection port may be coupled to many types of computing devices including at least one of stand-alone or networked computers, messaging devices, data communication devices, internet devices, or other computing devices or systems.

The term "release tab," as that term is used herein, denotes any structure or device of the latching/delatching mechanism that can be contacted by a human or machine to place the latching/delatching mechanism 10 in a delatched, or unlocked, state, including the pull tab discussed below with reference to FIGS. 1-6 and 14-21 and the bail discussed below with reference to FIGS. 7-13.

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

Figure 2:
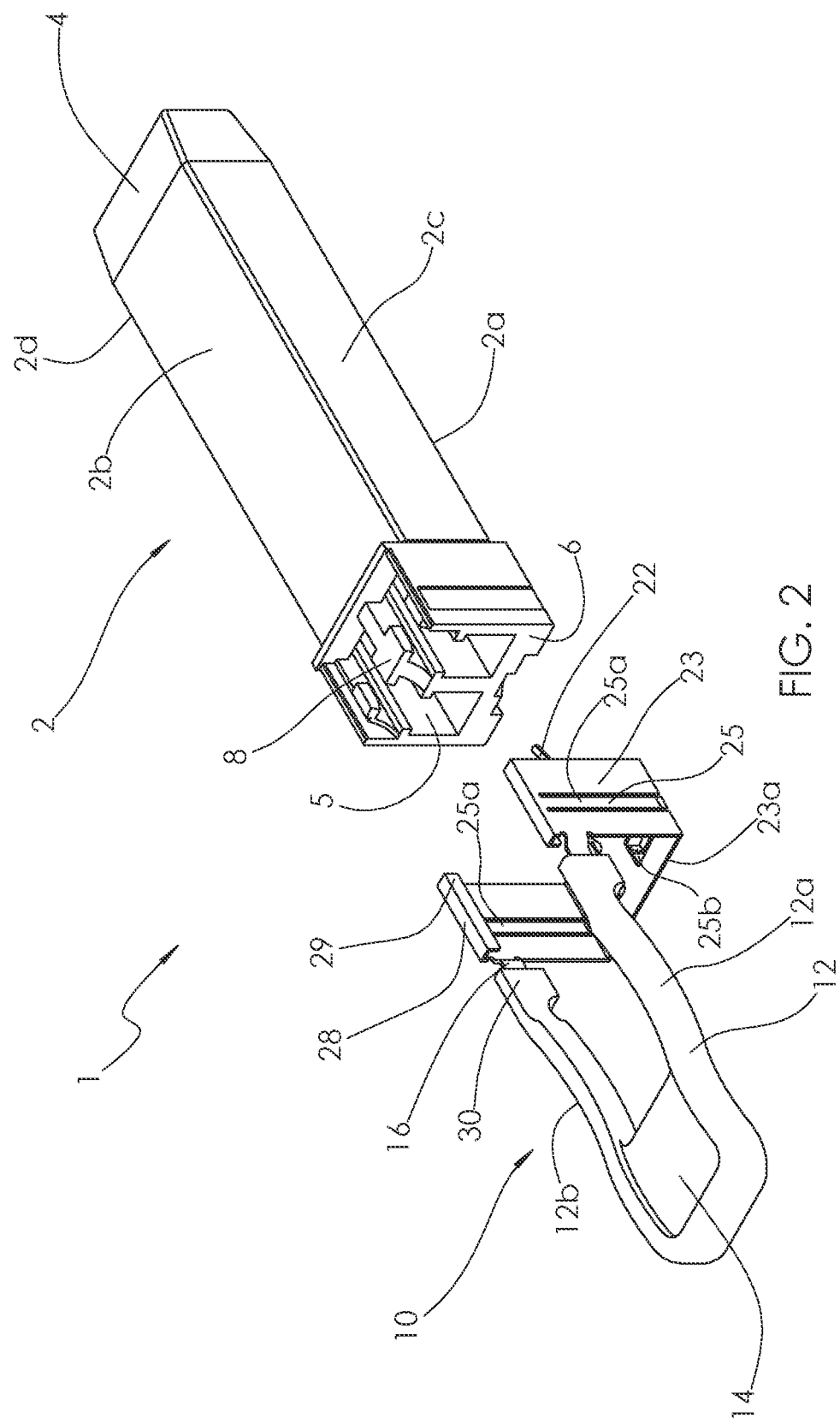
FIG. 2 is a top perspective view of the pluggable transceiver module shown in FIG. 1 showing the latching/delatching mechanism decoupled from and spaced apart from the module body to show features of the latching/delatching mechanism.
Figure 3:
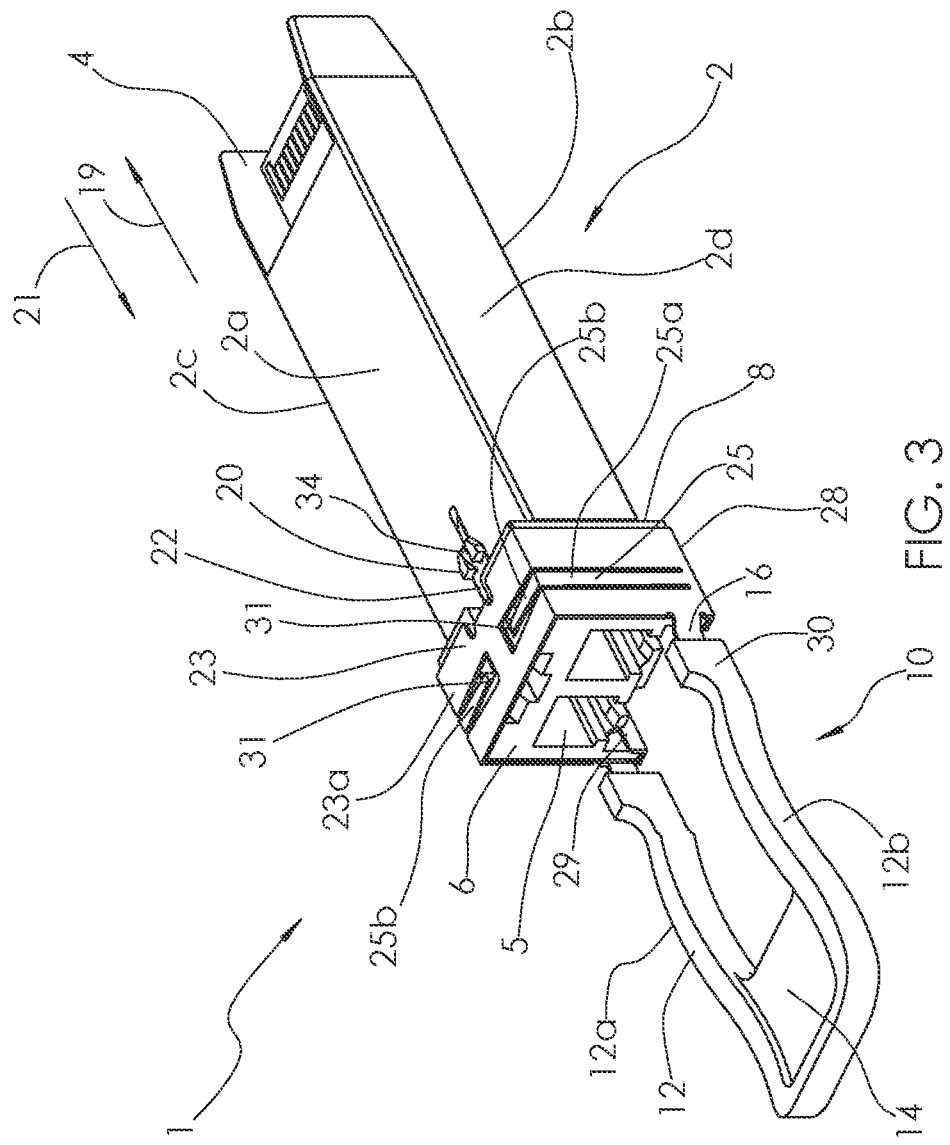
FIG. 3 is a bottom perspective view of the pluggable transceiver module shown in FIG. 1 with the latching/delatching mechanism secured to the module body.
Figure 4:
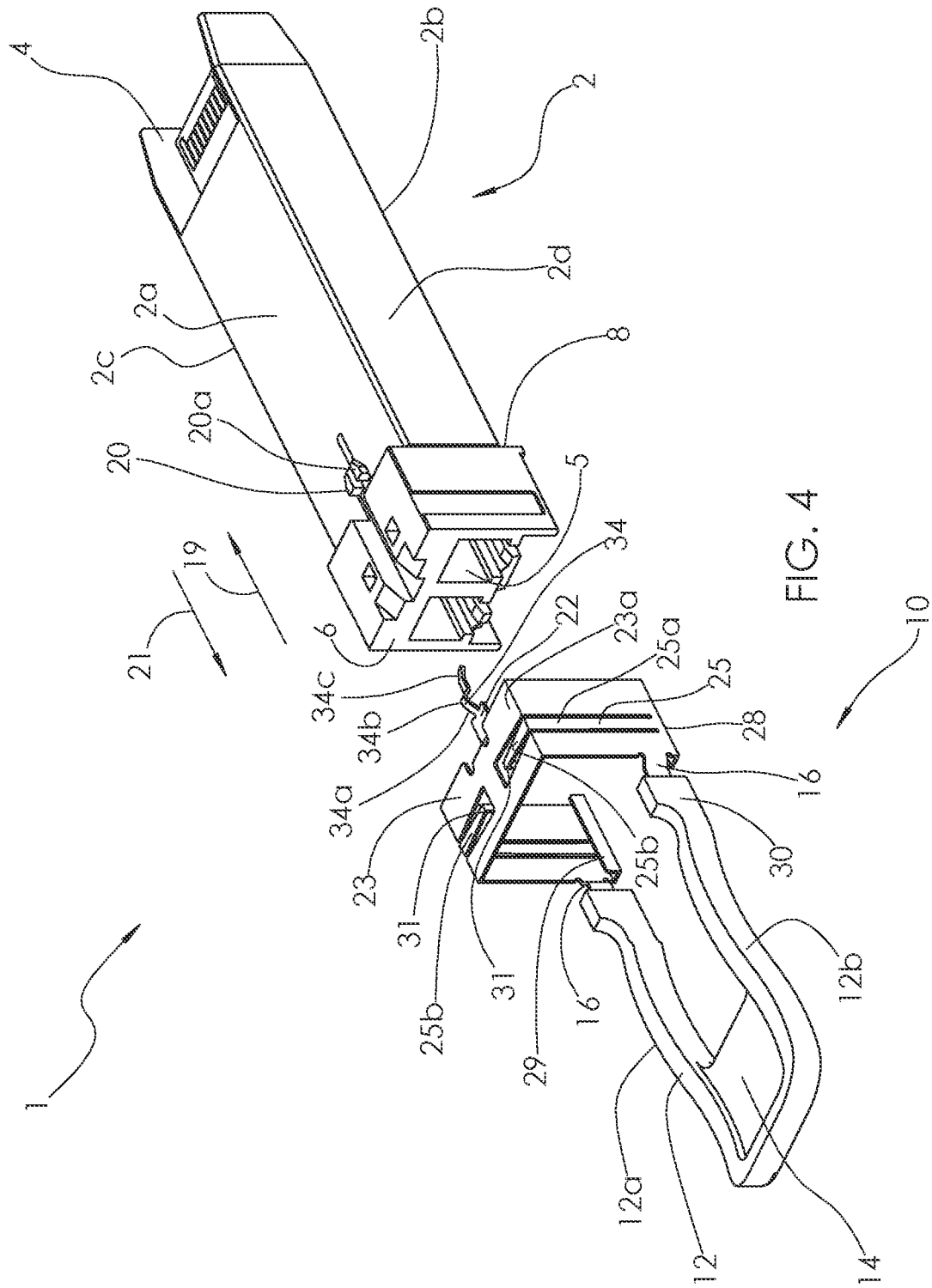
FIG. 4 is a bottom perspective view of the pluggable transceiver module shown in FIG. 1 showing the latching/delatching mechanism decoupled from and spaced apart from the module body to show features of the latching/delatching mechanism.
Figure 5:
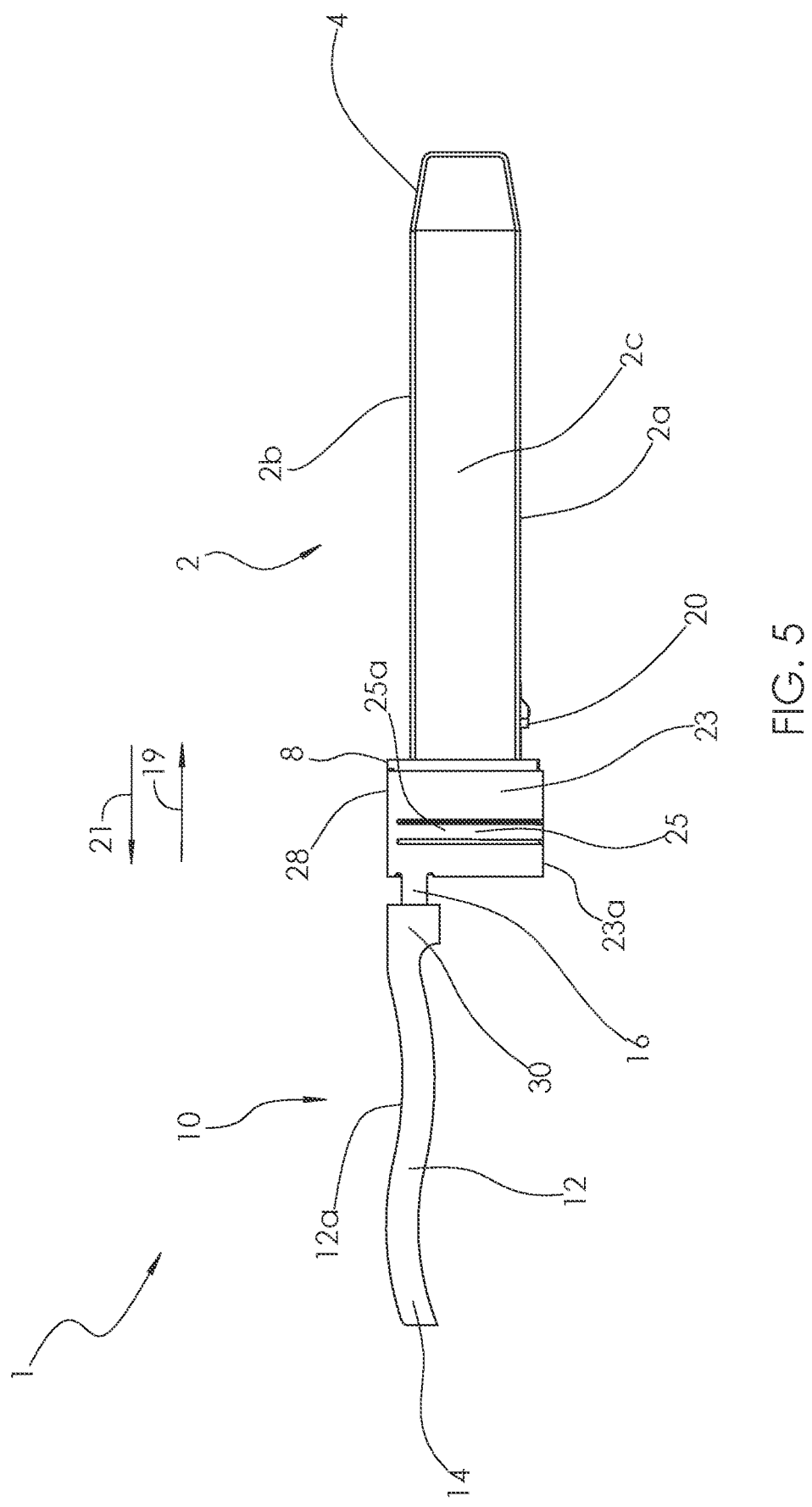
FIG. 5 is a side elevation view of the pluggable transceiver module shown in FIGS. 1-4 with the latching/delatching mechanism in the latched state.
Figure 6:
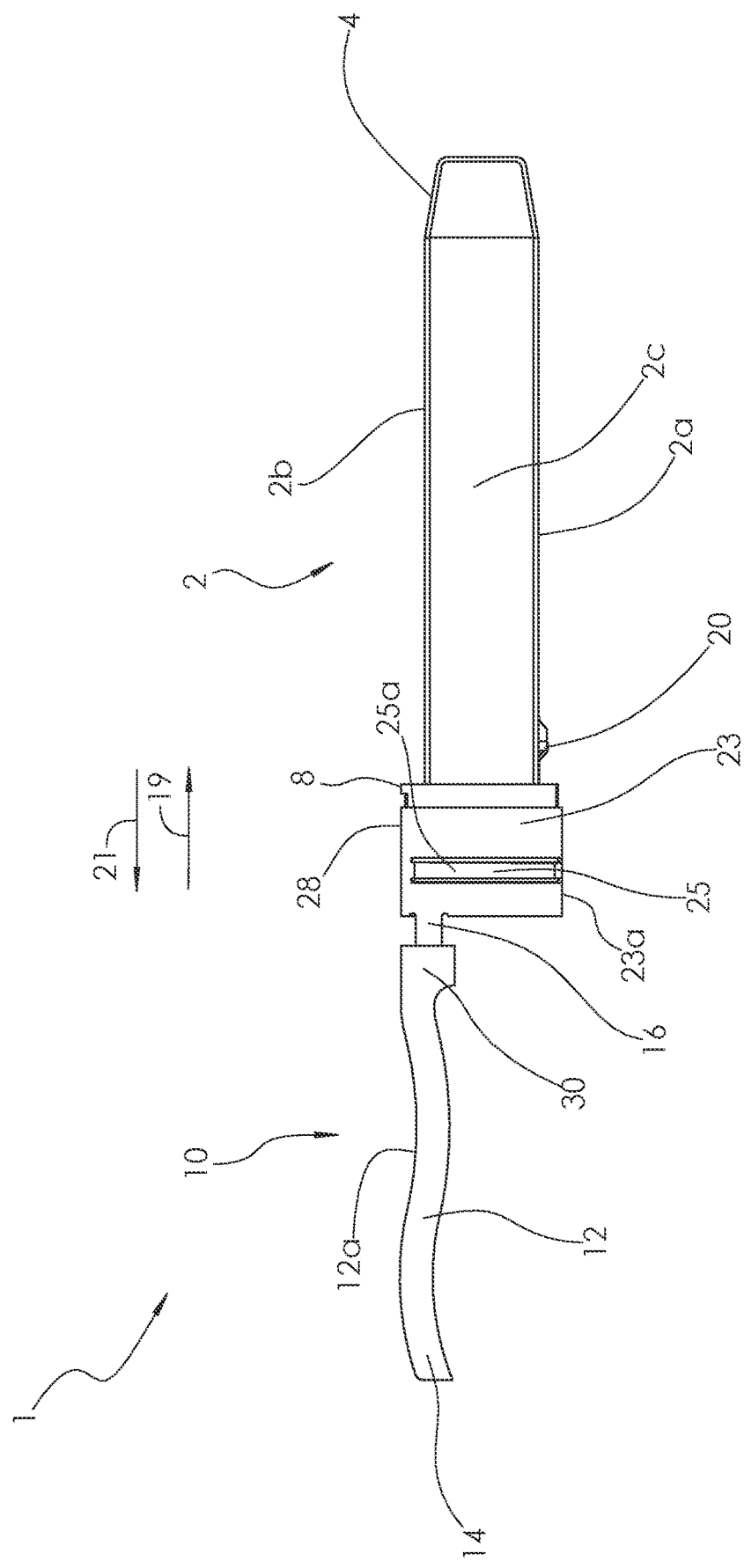
FIG. 6 is a side elevation view of the pluggable transceiver module shown in FIGS. 1-4 with the latching/delatching mechanism in the partially delatched state in which the module body is biased, or urged, forward in the direction of allow in an attempt to return the module body to the latched position as a pulling force in the direction of arrow 21 is being exerted on a release tab of the latching/delatching mechanism.

FIG. 1 is a top perspective view of a pluggable transceiver module 1 having a latching/delatching mechanism 10 secured to the body 2 of the module 1 in accordance with a representative embodiment in which the latching/delatching mechanism 10 is a pull tab-type of latching/delatching mechanism 10. FIG. 2 is a top perspective view of the pluggable transceiver module 1 shown in FIG. 1 showing the latching/delatching mechanism 10 decoupled from and spaced apart from the module body 2 to show features of the latching/delatching mechanism 10. FIG. 3 is a bottom perspective view of the pluggable transceiver module 1 shown in FIG. 1 with the latching/delatching mechanism 10 secured to the module body 2. FIG. 4 is a bottom perspective view of the pluggable transceiver module 1 shown in FIG. 1 showing the latching/delatching mechanism 10 decoupled from and spaced apart from the module body 2 to show features of the latching/delatching mechanism 10. FIG. 5 is a side elevation view of the pluggable transceiver module 1 shown in FIGS. 1-4 with the latching/delatching mechanism 10 in the latched state. FIG. 6 is a side elevation view of the pluggable transceiver module 1 shown in FIGS. 1-4 with the latching/delatching mechanism 10 in the partially delatched state in which the module body 2 is biased, or urged, forward in the direction of allow 19 in an attempt to return the module body 2 to the latched position as a pulling force in the direction of arrow 21 is being exerted on a release tab 12 of the latching/delatching mechanism 10.

The pluggable transceiver module 1 described herein is generally a six-sided rectangular cuboid, although the inventive principles and concepts are not limited to the module 1 having any particular shapes or dimensions. The shape, dimensions and other features are generally dictated by one or more industry standards or multi-source agreements (MSAs).

The module body 2 of the pluggable transceiver module 1 has a first end portion 4 configured to fit into a computer connection port. The first end portion 4 facilitates transmission of electrical signals between the pluggable transceiver module 1 and a computing device by aligning one or more contact areas on the terminal end of the first end portion 4 with a computer connection port coupled to a computing device. In one example, the computer connection port is a cage assembly contained in a line card permanently mounted on a printed circuit board (PCB).

The module body 2 of the pluggable transceiver module 1 has a second end portion 8 opposite the first end portion 4 that has a movable or fixed module connection port 5 disposed inside of the module body 2 and a connection surface 6 defining the port's opening. The module connection port 5 and connection surface 6 can interface with a cable or optical connection such as, for example, a Registered Jack 45 (RJ45) connector, Multiple Fiber Push On/Pull Off (MPO) connector, an MXC connector, an LC connector, a dual LC connector, an SC connector, an ST connector, or a connectorless interface that connects the module 1 to an electrical cable or one or more strands of a fiber optic bundle.

The pluggable transceiver module 1 further comprises at least one locking post 20 (FIGS. 3-6) that is movable by the latching/delatching mechanism 10 to move the post from a latched state to a delatched state and/or vice versa. In accordance with the representative embodiment described herein, the default or home position of the locking post 20 is the locked, or latched, position and the latching/delatching mechanism 10 is used to change the position of the post 20 relative to a latch structure of the computer connection port (in this embodiment, a tongue with an opening that receives the post 20) from the locked position to the unlocked position. However, the default or home position of the locking post 20 could instead be the unlocked, or delatched, position and the latching/delatching mechanism 10 could instead be used to move the post 20 from the unlocked position to the locked position. As another alternative, the post 20 could have no home or default position and the latching/delatching mechanism 10 could instead be configured to move the post 20 from the unlocked position to the locked position, and vice versa.

The locking post 20 ensures that a working junction is maintained between the pluggable transceiver module 1 and a computing device by preventing detachment of the pluggable transceiver module 1 from a computer connection port (not shown) when the latching/delatching mechanism 10 is in the latched state and the post 20 is in the latched position. The locking post 20 may be located on the bottom surface 2*a*, top surface 2*b*, or one of the side surfaces 2*c* and 2*d* of the module body 2. The locking post 20 may be integrated into the module body 2, the release structure 23, the release tab 12 or any other component in module assembly, or it may be a separate device that is mechanically coupled to the module body 2, the release structure 23, the release tab 12 or any other component in module assembly. In accordance with this representative embodiment, the locking post 20 is integrated into the module body 2 and is disposed on the bottom surface 2*a* (FIGS. 3-6) of the module body 2. As indicated above, the locking post 20 is configured to catch the latch structure (not shown) disposed in a computer connection port (not shown) when the latching/delatching mechanism 10 is in the latched state. When the latch structure of the computer connection port is caught by the locking post 20, the module body 2 sits secured and properly aligned in the computer connection port, thereby maintaining the electrical connection between the computing device and pluggable transceiver module 1.

In accordance with this representative embodiment, the latching/delatching mechanism 10 comprises a release tab (pull tab) 12 (FIGS. 1-6), a release structure 23 (FIGS. 1-6) mechanically coupled to the release tab 12 and to the module body 2, and a release arm 22 (FIGS. 2-4) that engages the locking post 20 to change a position of the locking post 20 relative to a latch structure of the computer connection port from a latched (i.e., locked) position to a delatched (i.e., unlocked) position. In accordance with this representative embodiment, the release tab 12 comprises first and second release tab arms 12*a* and 12*b*, respectively, and a crossmember 14. Feet 30 disposed on ends of the respective release tab arms 12*a* and 12*b* are mechanically coupled to the release structure 23.

The locking post 20 in accordance with this embodiment is spring loaded such that the locking post 20 is biased toward the latched position. As will be described below in detail, moving the latching/delatching mechanism 10 from the latched state to the delatched state causes the release arm 22 to move the locking post 20 from the latched position to the delatched position. This occurs when a sufficient pull force is exerted on the release tab 12 in the direction of arrow 21 away from, and generally parallel to, the module body 2. The manner which the latching/delatching mechanism 10 works is described below in more detail.

With reference to the bottom perspective view shown in FIG. 4, the release arm 22 can be generally shaped like a wire having a first portion 34*a* that is fixedly secured to a bottom surface 23*a* of the release structure 23, a second portion 34*b* that arches in a direction away from the bottom surface 23*a* of the release structure 23, and a third portion 34*c* that can slightly curved, or non-linear. The width or diameter of the release arm 22 is about the same as, or slightly smaller than, the diameter or width of a slot 20*a* formed in the locking post 20. In the fully-assembled state shown in FIG. 3, the arched second portion 34*b* (FIG. 4) of the release arm 22 is seated within the slot 20*a* when the locking post 20 is in the locked state, or position. The locking post 20 extends outwardly and away from the bottom surface 2*a* of the module body 2 such that the post 20 is disposed to catch the latch structure of the computer connection port, which in this example is a tongue having an opening in it that receives the locking post 20.

With reference to FIGS. 3 and 4, when a pulling force is exerted on the release tab 12 of the latching/delatching mechanism 10 in the direction of arrow 21 away from, and generally parallel to, the module body 2, the arched portion 34*b* (FIG. 4) of the release arm 22 leaves the slot 20*a* (FIG. 4) formed in the locking post 20 and the third portion 34*c* (FIG. 4) of the release arm 22 enters the slot 20*a* (FIG. 4). The arched portion 34*b* presses against the tongue to move it in a direction away from the bottom surface 2*a* of the module body 2 to cause the post 20 to be withdrawn from the opening in the tongue, thereby disengaging the latch structure and placing the post in the unlocked position. In this unlocked position, the locking post 20 no longer engages the latch structure of the computer connection port, or cage, which allows the module body 2 to be extracted from the computer connection port by continued exertion of the pulling force on the release tab 12 in the direction of arrow 21.

Another important feature of the latching/delatching mechanism 10 is that is has a spring-loaded configuration that urges or biases the latching/delatching mechanism 10 in the direction indicated by arrow 19 when the pulling force in the direction of arrow 21 is being exerted on release tab 12, as shown in FIG. 6. This biasing ensures that if the pulling force in the direction of arrow 21 is not of sufficient magnitude and duration to cause the module body 2 to be extracted from the computer connection port, the latching/delatching mechanism 10 returns to the latched position shown in FIG. 5 to keep the module body 2 locked in its aligned position within the computer connection port.

A variety of spring-loading configurations for the latching/delatching mechanism 10 can be used for this purpose. One suitable configuration is shown in FIGS. 1-6 and will now be described. In accordance with this representative embodiment, the spring-loaded configuration of the latching/delatching mechanism 10 comprises at least a first spring member 25 that is integrated into, or integrally formed in, the release structure 23. The first spring member 25 has a first portion 25*a* that joins with the main body of the release structure 23 (FIG. 3) and a second portion 25*b* that is mechanically coupled to the module body 2 by an anchor 31 (FIG. 3).

Although a single spring member 25 can be used as the spring-loaded configuration, in accordance with this representative embodiment the latching/delatching mechanism 10 further comprises a second spring member 25 opposite the first spring member 25 that is also integrated into, or integrally formed in, the release structure 23. Like the first spring member 25, the second spring member 25 has a first portion 25*a* that joins with the main body of the release structure 23 and a second portion 25*b* that is mechanically coupled to the module body 2 by an anchor 31. Although the first and second spring members 25 are shown as having identical configurations and as being symmetrically located on the main body of the release structure 23, they can have different configurations and be asymmetrically located.

Integrating the spring member(s) 25 into the release structure 23 in accordance with this embodiment allows the release structure 23 to be made as a single piece part design rather than separate piece parts. Accordingly, the release structure 23 can involve fewer distinct parts and can be easier to manufacture, assemble, install, and upgrade compared to known transceiver modules that incorporate spring-loading into the latching/delatching mechanism by using multiple separate spring-loading components.

In accordance with this embodiment, the release structure 23 with the integrated spring member(s) 25 attaches to the exterior of the module body 2 around the second end portion 8 of the module body 2. The second portion 25b has a first end that transitions into the first portion 25a and a second end that is mechanically coupled to the module body 2 by the anchor 31. Relative motion between the release structure 23 and the module body 2 strains the spring member 25. This strain stores the applied external work as potential mechanical energy. When this applied external force is removed, the mechanical potential energy is converted into kinetic energy that returns the release structure 23 to the home position on the module body 2 shown in FIGS. 3 and 5.

The release structure 23 having the integrated spring member 25 may be configured for use with a wide variety of transceiver modules including, for example, QSFP-type modules including QSFP, QSFP+, QSFP14, QSFP28, QSFP56, QSFP-DD, and µQSFP modules, SFP-type modules including, for example, SFP, SFP+, and SFP28 modules, and, C form factor type modules including, for example, CFP, CFP2, and CFP4 modules. Application of a pulling force of appropriate amplitude and duration in the direction of arrow 21 to the release structure 23 will overcome the biasing effect of the spring member 25 and move the release structure 23 relative to the module body 2 to the extent that further movement of the spring member 25 is not possible, at which point the pulling force is transferred from the latching/delatching mechanism 10 to the module body 2 to cause it to be extracted from the computer connection port.

Figure 7:
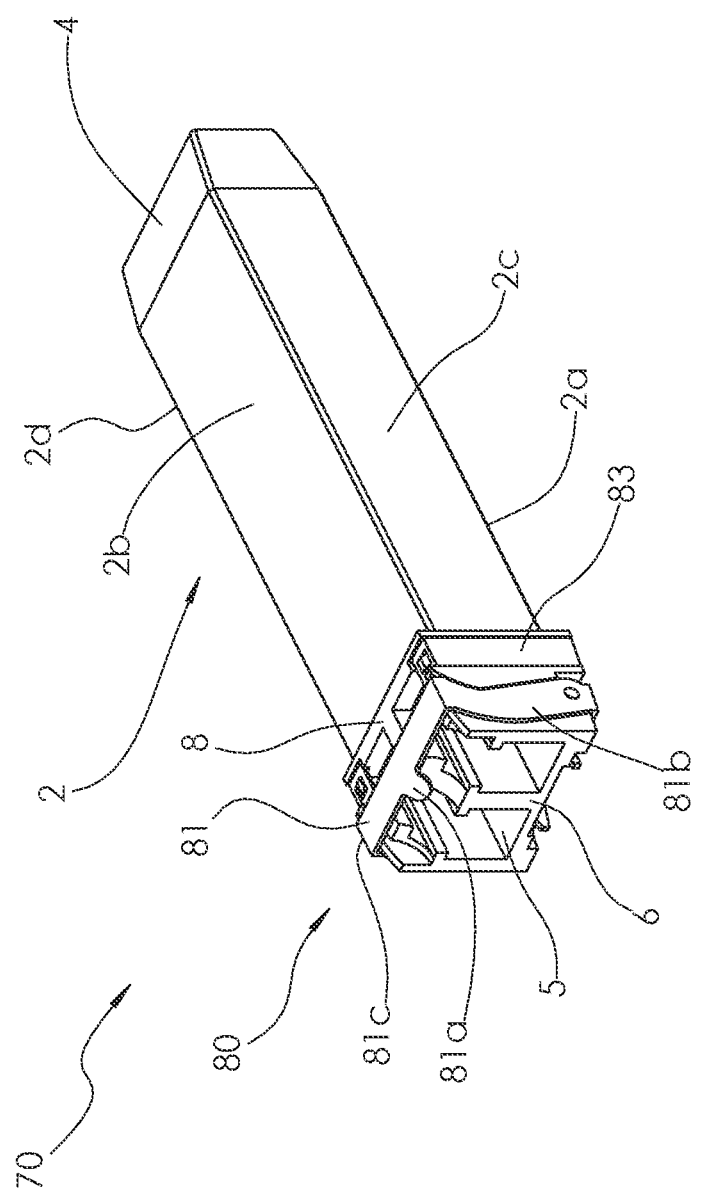
FIG. 7 is a top perspective view of the pluggable transceiver module having a latching/delatching mechanism secured to the module body and in the latched position, or state.
Figure 8:
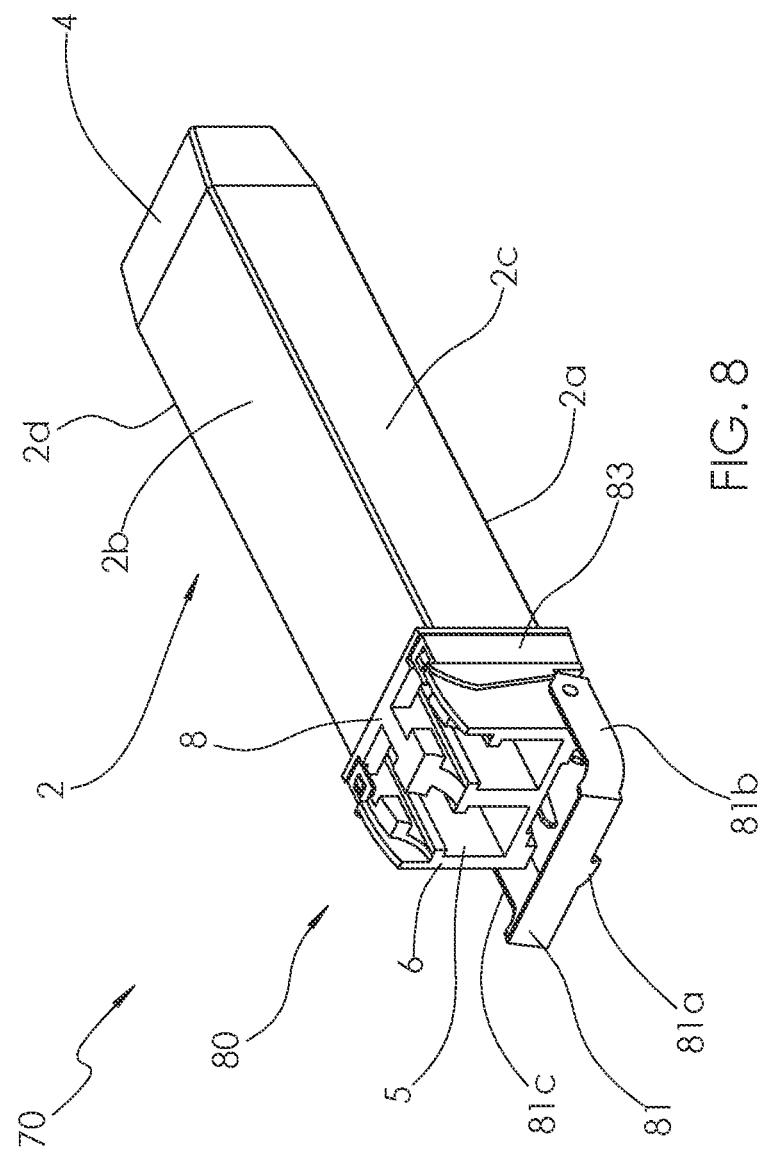
FIG. 8 is a top perspective view of the pluggable transceiver module shown in FIG. 7 showing a bail of the latching/delatching mechanism rotated to the delatched position, or state.
Figure 9:
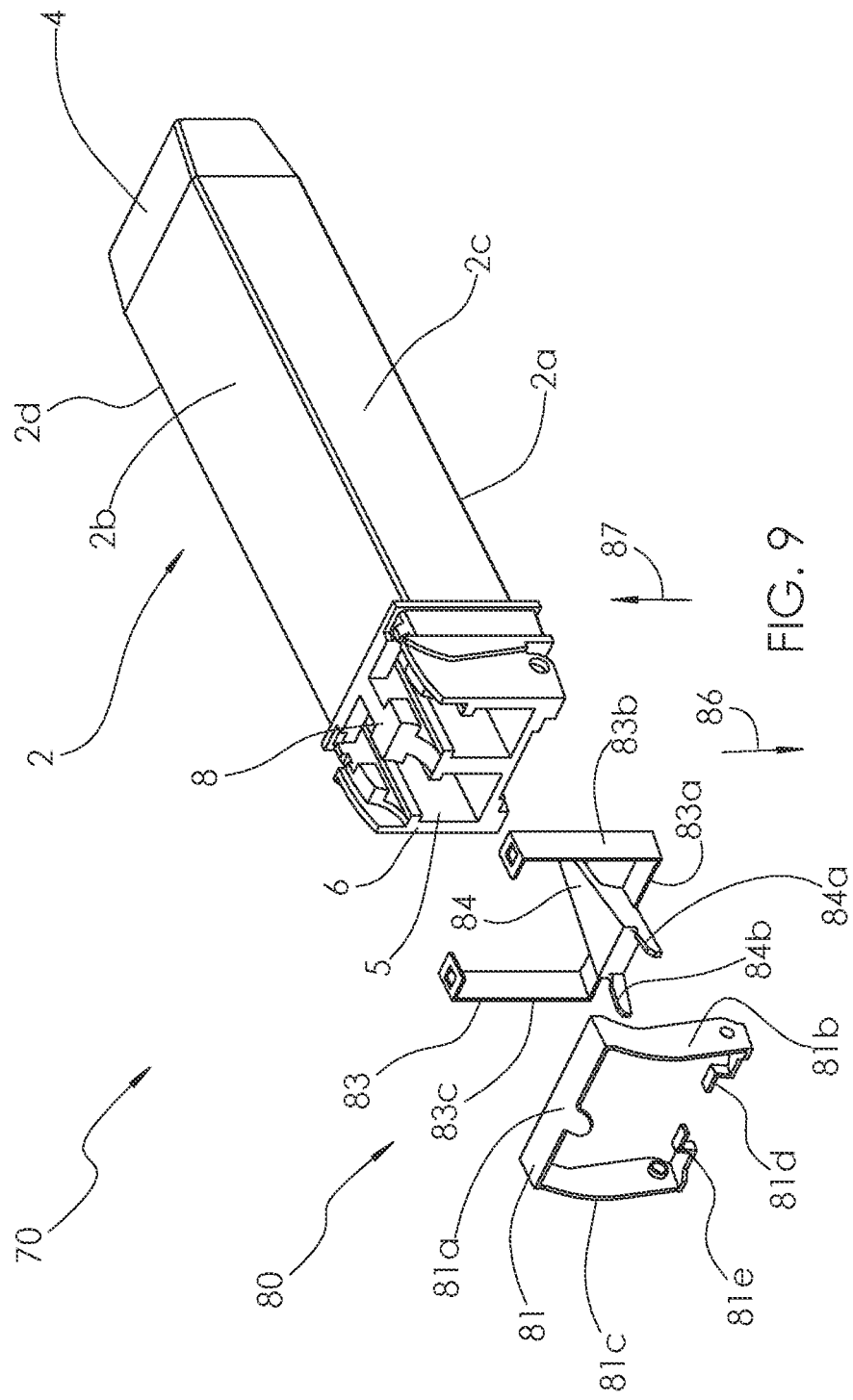
FIG. 9 is a top perspective view of the pluggable transceiver module shown in FIG. 7 showing the latching/delatching mechanism decoupled from and spaced apart from the module body to show features of the latching/delatching mechanism.
Figure 10:
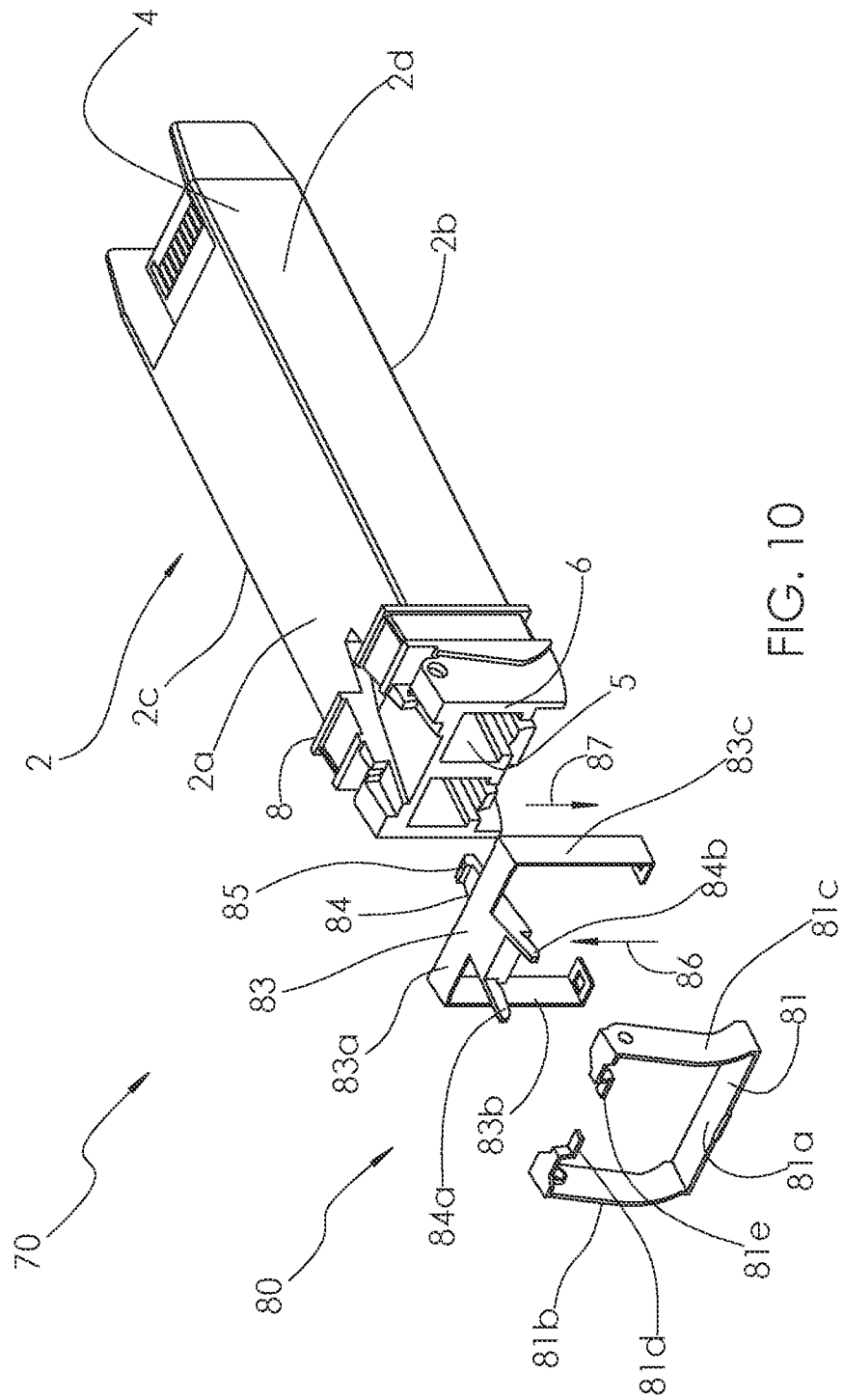
FIG. 10 is a bottom perspective view of the pluggable transceiver module shown in FIG. 7 showing the latching/delatching mechanism decoupled from and spaced apart from the module body to show features of the latching/delatching mechanism.
Figure 11:
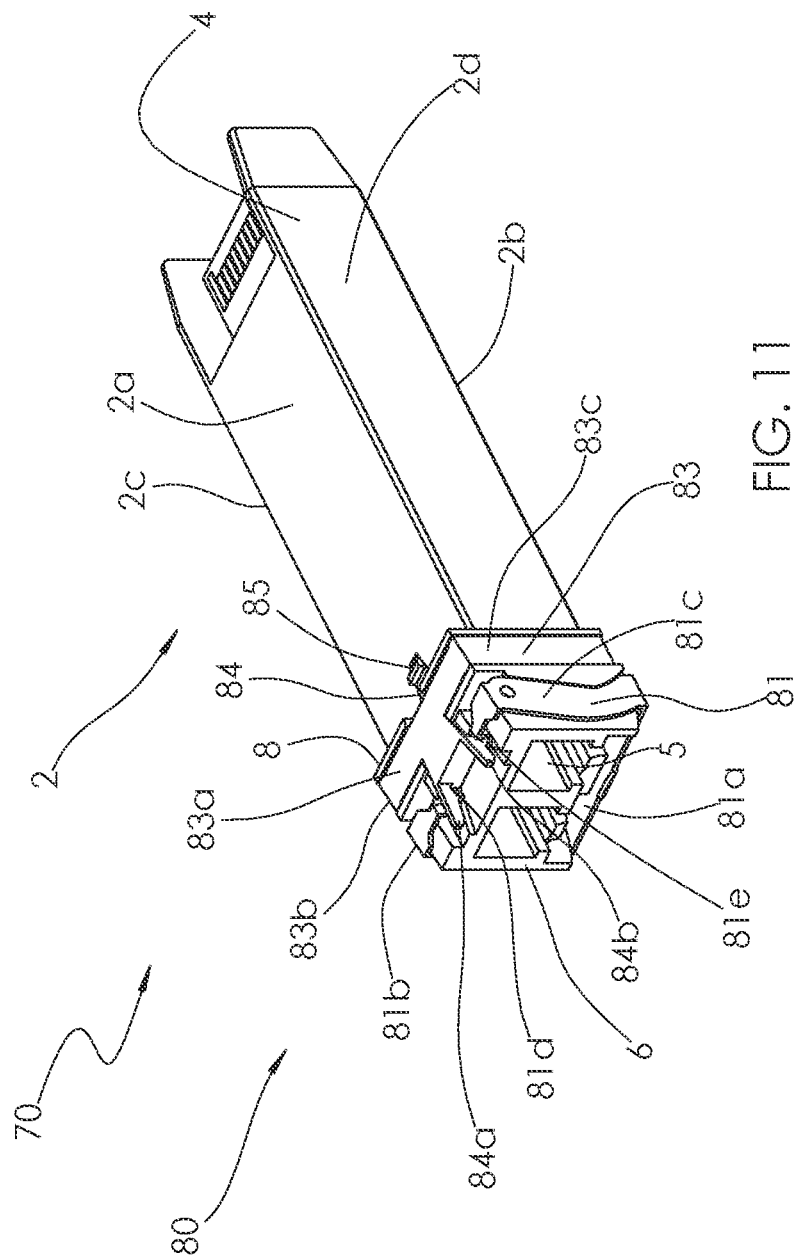
FIG. 11 is a bottom perspective view of the pluggable transceiver module shown in FIG. 7 showing the latching/delatching mechanism secured to the module body and in the latched position, or state.
Figure 12:
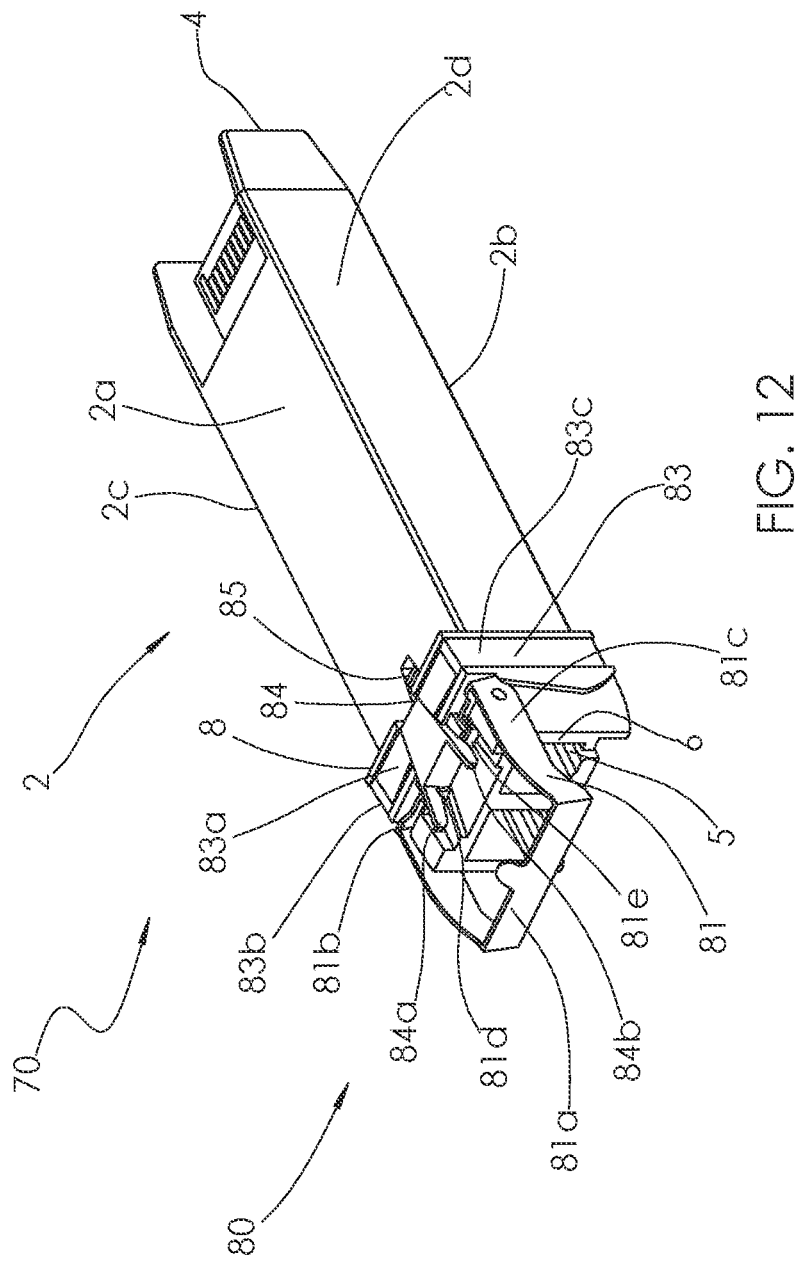
FIG. 12 is a bottom perspective view of the pluggable transceiver module shown in FIG. 7 showing the bail of the latching/delatching mechanism rotated to the delatched position, or state.
Figure 13:
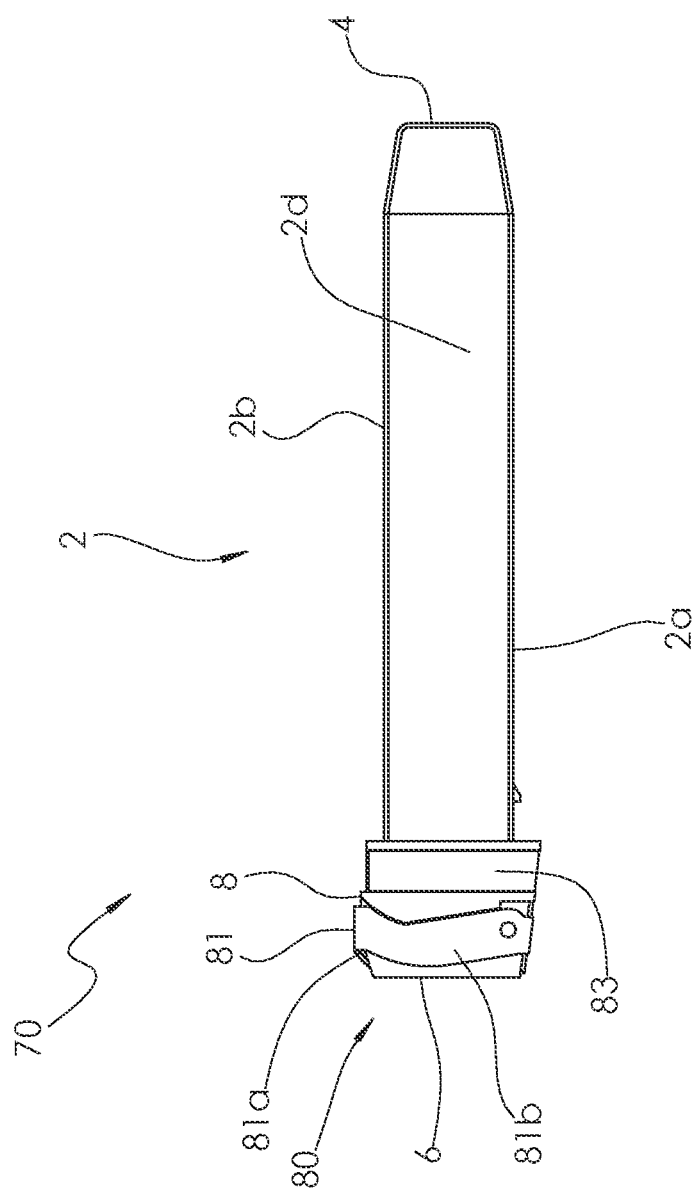
FIG. 13 is a side elevation view of the pluggable transceiver module shown in FIG. 7 with the latching/delatching mechanism in the latched state.

FIGS. 7-13 illustrate the pluggable transceiver module 70 in accordance with another representative embodiment in which the latching/delatching mechanism 80 is a rotating bail-type of latching/delatching mechanism. FIG. 7 is a top perspective view of the pluggable transceiver module 70 having a latching/delatching mechanism 80 secured to the module body 2 and in the latched position, or state. FIG. 8 is a top perspective view of the pluggable transceiver module 70 shown in FIG. 7 showing a bail 81 of the latching/delatching mechanism 80 rotated to the delatched position, or state. FIG. 9 is a top perspective view of the pluggable transceiver module 70 shown in FIG. 7 showing the latching/delatching mechanism 80 decoupled from and spaced apart from the module body 2 to show features of the latching/delatching mechanism 80. FIG. 10 is a bottom perspective view of the pluggable transceiver module 70 shown in FIG. 7 showing the latching/delatching mechanism 80 decoupled from and spaced apart from the module body 2 to show features of the latching/delatching mechanism 80. FIG. 11 is a bottom perspective view of the pluggable transceiver module 70 shown in FIG. 7 showing the latching/delatching mechanism 80 secured to the module body 2 and in the latched position, or state. FIG. 12 is a bottom perspective view of the pluggable transceiver module 70 shown in FIG. 7 showing the bail 81 of the latching/delatching mechanism 80 rotated to the delatched position, or state. FIG. 13 is a side elevation view of the pluggable transceiver module 70 shown in FIG. 7 with the latching/delatching mechanism 80 in the latched state.

In accordance with this representative embodiment, the latching/delatching mechanism 80 comprises the release tab 81, which in this case is a rotating bail, and a release structure 83 mechanically coupled to the release tab 81 and to the module body 2. A release arm 84 (FIG. 9) of the release structure 83 has a locking post 85 (FIG. 10) disposed on a distal end thereof. The bail 81 operates as a cam and the release arm 84 operates as a cam follower. Rotation of the bail 81 from the latched position (FIGS. 7 and 11) to the delatched position (FIGS. 8 and 12) causes the release arm 84 to rotate in the opposite direction, which causes the locking post 85 disposed on the distal end of the release arm 84 to disengage the latching structure of the computer connection port to allow the module 70 to be extracted.

With reference to FIGS. 9 and 10, the bail 81 has a crossmember 81a and first and second side members 81b and 81c, respectively. Proximal ends of the side members 81b and 81c are joined to the crossmember 81a. When the module 70 is in its assembled state, the distal ends of the side members 81b and 81c are rotatably coupled to the module body 2. The distal ends of the first and second side members 81b and 81c, respectively, have inwardly-directed features 81d and 81e, respectively, disposed thereon that come into contact with features 84a and 84b, respectively, disposed on the proximal end of the release arm 84 as the bail 81 is rotated from the latched position toward the delatched position. As the features 81d and 81e come into contact with features 84a and 84b, respectively, the features 81d and 81e exert a force on the proximal end of the release arm 84 in the direction of arrow 86 that causes the distal end of the release arm 84 on which the locking post 85 is disposed to move in the opposite direction indicated by arrow 87 toward the interior of the module body 2 to retract the post 85, thereby placing the post 85 in the unlocked position relative to the latching structure of the computer connection port to allow the module 70 to be extracted.

Another important feature of the latching/delatching mechanism 80 is that it has a spring-loaded configuration that rotationally biases the bail 81 of the latching/delatching mechanism 10 back toward the latched position when the bail 81 is been rotated from the latched position toward the delatched position, but has not yet reached the fully delatched position. In accordance with a representative embodiment, rotation of the bail 81 away from the latched position by an angle of less than about 90° moves the locking post 85 to the fully delatched position such that rotation of the bail 81 beyond this angle has no effect. When the bail 81 is rotated to any angular position within the range of from the latched position of about 0° to about 90°, the rotational biasing provided by the spring-loaded configuration will cause the bail 81 to return to the latched position if the pull force being applied by the user to rotate the bail 81 is removed. This biasing ensures that if the pull force is not of sufficient magnitude and duration to move the bail to the delatched position, it will return to the latched position shown in FIG. 7 to keep the module body 2 locked in its aligned position within the computer connection port.

As indicated above, a variety of spring-loading configurations for the latching/delatching mechanism 80 can be used for this purpose. One suitable configuration will now be described with reference to FIGS. 9, 10 and 12. In accordance with this representative embodiment, the spring-loaded configuration of the latching/delatching mechanism 80 comprises portions of the release structure 83 that temporarily deform as the bail 81 is being rotated from the latched position toward the delatched position. If the force that is used to rotate the bail 81 is removed, the temporarily deformed portions of the release structure 83 restore to their original shapes, which cause the release arm 84 and the bail 81 to return to their latched positions.

In addition to having the release arm 84, the release structure 83 also has a crossmember 83a and first and second side members 83b and 83c, respectively. The crossmember 83a is mechanically coupled with, or joined to, the distal end of the release arm 84 and is mechanically coupled with, or joined to, proximal ends of the first and second side members 83b and 83c, respectively, as shown in FIGS. 9 and 10. In accordance with a representative embodiment, the release structure 83 is formed as a unitary piece part of sheet metal, although it could be made of multiple piece parts and could be made of other materials. Distal ends of the side members 83b and 83c are anchored to the module body 2, thereby securing the release structure 83 to the module body 2. Because of this anchoring of the side members 83b and 83 to the module body 2, rotation of the release arm 84 caused by rotation of the bail 81 away from the latched position toward the delatched position stresses the side members 83b and 83c and the cross member 83a, which stresses the sides of the release arm 84 and causes them to twist, or deform. This stress in the release structure 83 is translated from the release structure 83 into the bail 81 through the contact between features 84a and 84b of the release arm 84 and the features 81d and 81e, respectively, of the bail 81. This translated stress biases the bail 81 back toward the latched position. Thus, if the pull force being applied to the bail 81 to move it from the latched position to the delatched position is removed before the bail 81 reaches the delatched position, the bail 81 returns to the latched position. Thus, these elements of the release structure 83 cooperate to form a spring member that spring loads the bail 81 to bias it toward the latched position.

Integrating the spring-loading configuration into the release structure 83 in accordance with this embodiment allows the release structure 83 to be made as a single piece part design rather than as separate piece parts that are coupled together. Accordingly, the release structure 83 can involve fewer distinct parts and can be easier to manufacture, assemble, install, and upgrade compared to known transceiver modules that incorporate spring-loading into the latching/delatching mechanism by using multiple separate spring-loading components.

The release structure 83 having the integrated spring-loading configuration may be configured for use with a wide variety of transceiver modules including, for example, QSFP-type modules including QSFP, QSFP+, QSFP14, QSFP28, QSFP56, QSFP-DD, and μQSFP modules, SFP-type modules including, for example, SFP, SFP+, and SFP28 modules, and, C form factor type modules including, for example, CFP, CFP2, and CFP4 modules.

A variety of spring-loading configurations for the latching/delatching mechanism 80 can be used for this purpose. The configuration described above with reference to FIGS. 7-12 is one example of a suitable configuration, but many others are also possible, as will be understood by those of skill in the art in view of the description provided in the present disclosure.

FIGS. 14-21 are directed to a pluggable transceiver module 90 in accordance with another representative embodiment in which a latching/delatching mechanism 100 combines features of the latching/delatching mechanisms 10 of FIGS. 1-6 and 80 of FIGS. 7-13. In accordance with this representative embodiment, the latching/delatching mechanism 100 is a pull tab-type latching/delatching mechanism having a pull tab that is the same as release tab 12 shown in FIGS. 1-6. The release tab 12 of the latching/delatching mechanism 100 of FIGS. 14-21 serves the same purposes and performs the same functions of the release tab 12 of the latching/delatching mechanism 10 discussed above with reference to FIGS. 1-6.

Figure 14:
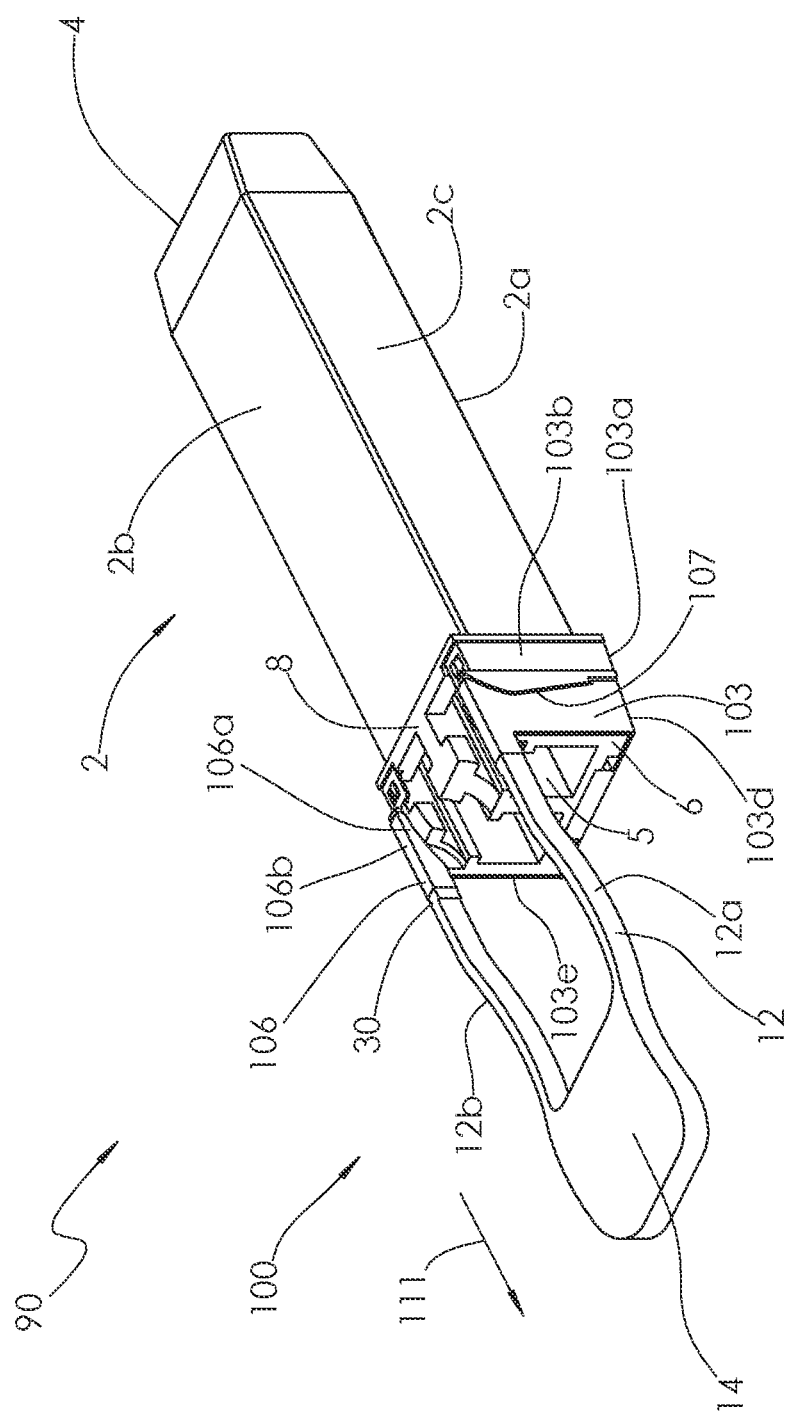
FIG. 14 is a top perspective view of the pluggable transceiver module in accordance with another representative embodiment with the latching/delatching mechanism secured to the module body and in the latched position, or state.
Figure 15:
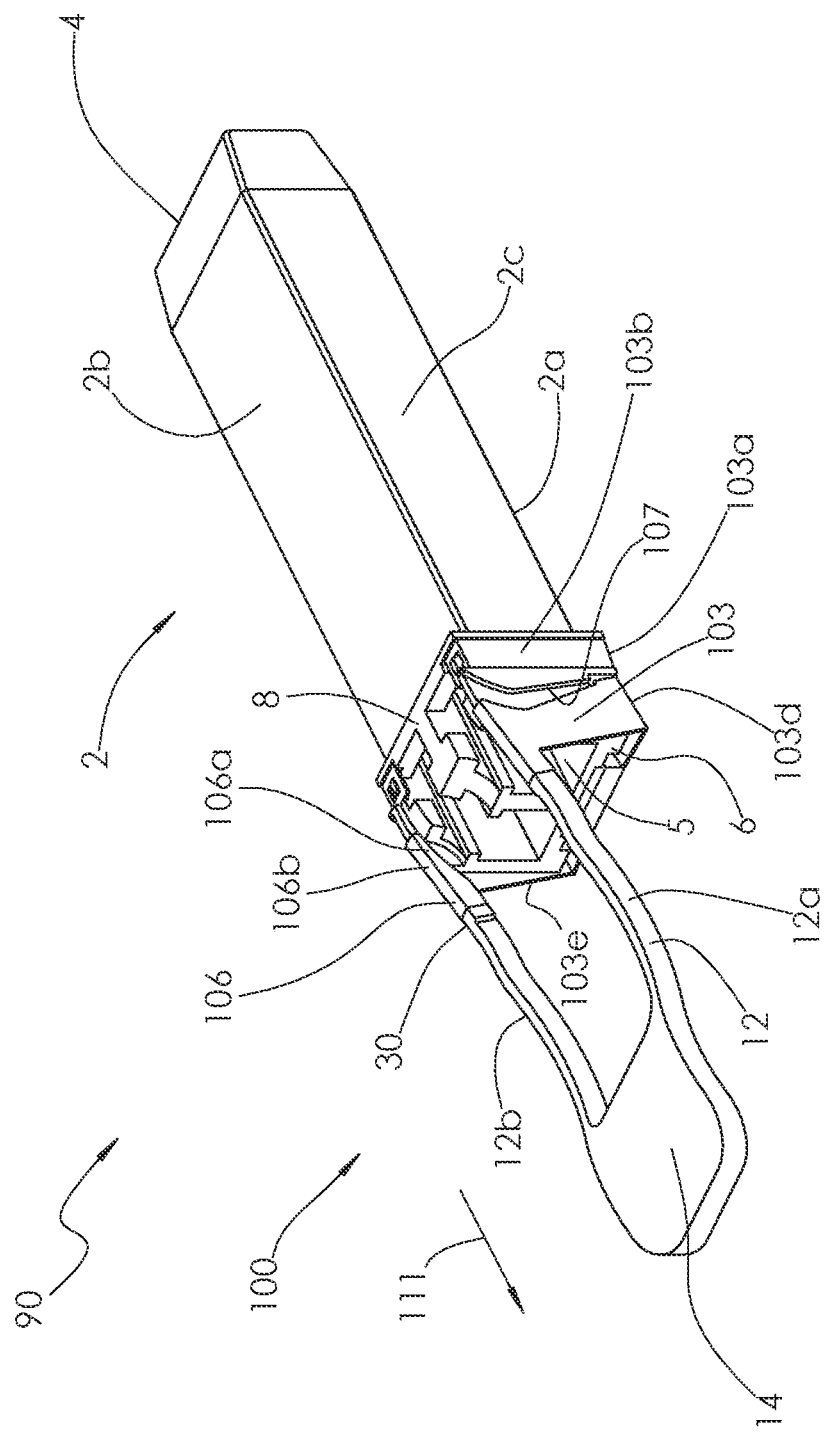
FIG. 15 is a top perspective view of the pluggable transceiver module shown in FIG. 14 showing the latching/delatching mechanism in the delatched position, or state.
Figure 16:
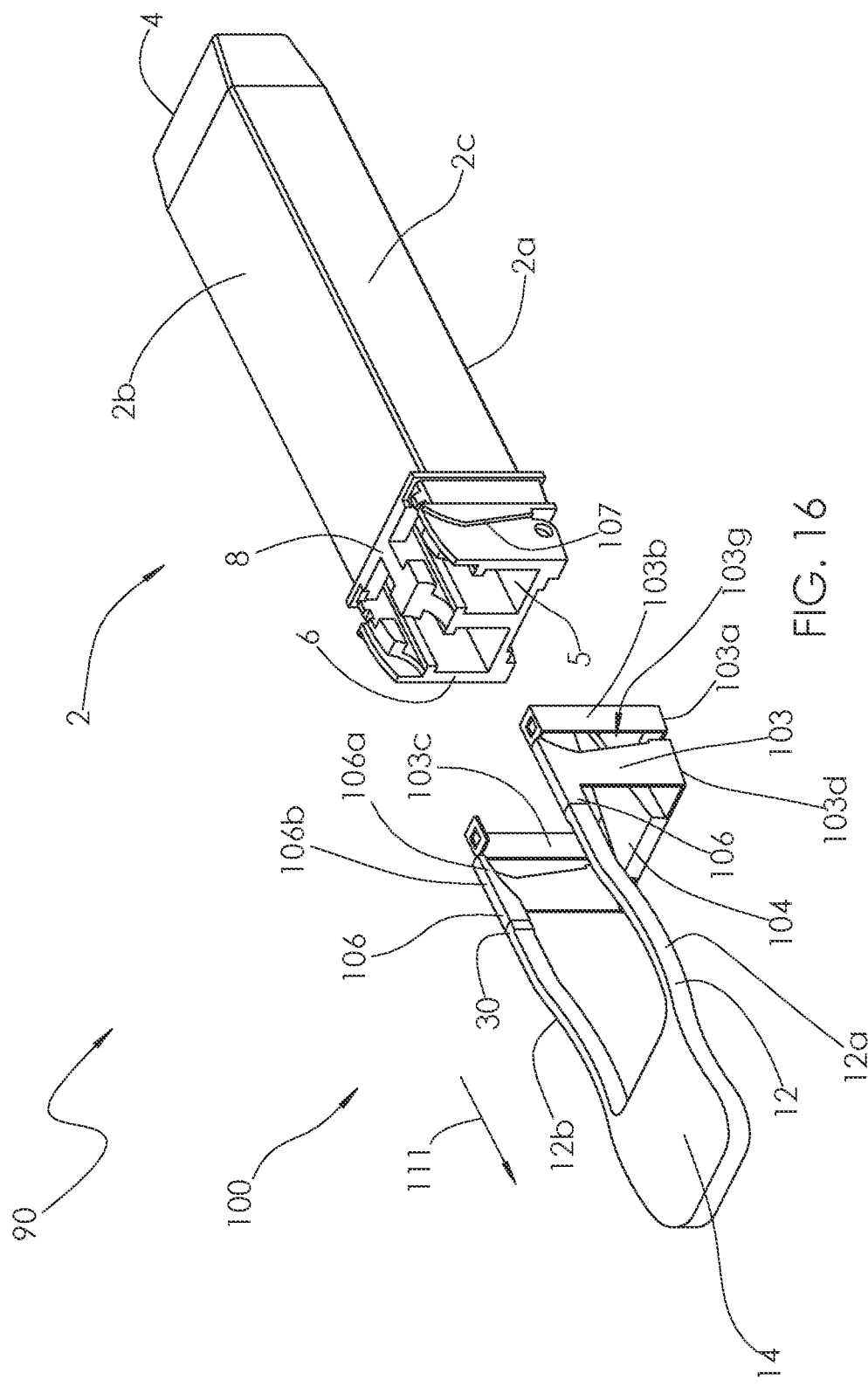
FIG. 16 is a top perspective view of the pluggable transceiver module shown in FIG. 14 showing the latching/delatching mechanism decoupled from and spaced apart from the module body 2 to show features of the latching/delatching mechanism.
Figure 17:
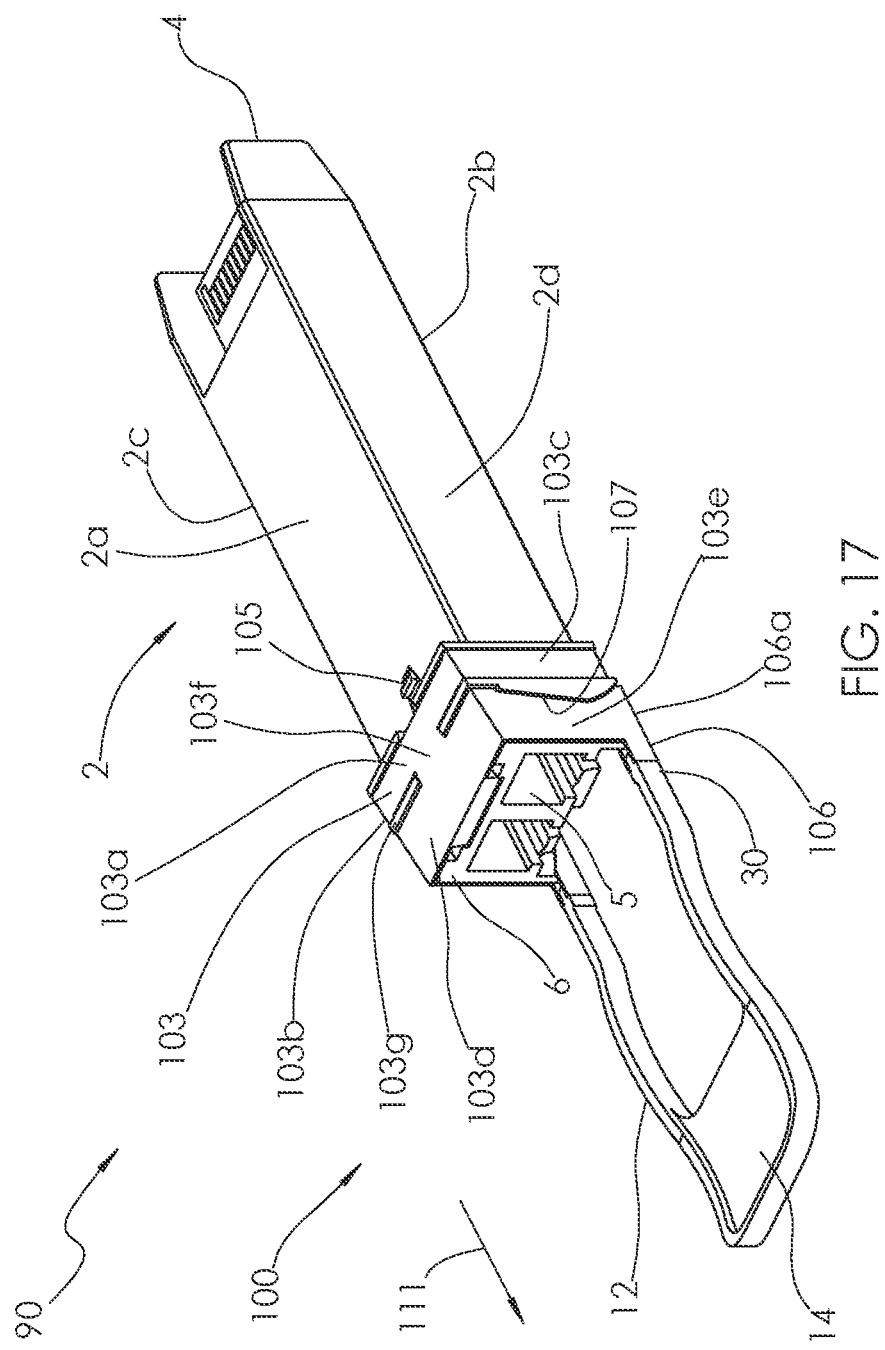
FIG. 17 is a bottom perspective view of the pluggable transceiver module shown in FIG. 14 showing the latching/delatching mechanism secured to the module body and in the latched position, or state.
Figure 18:
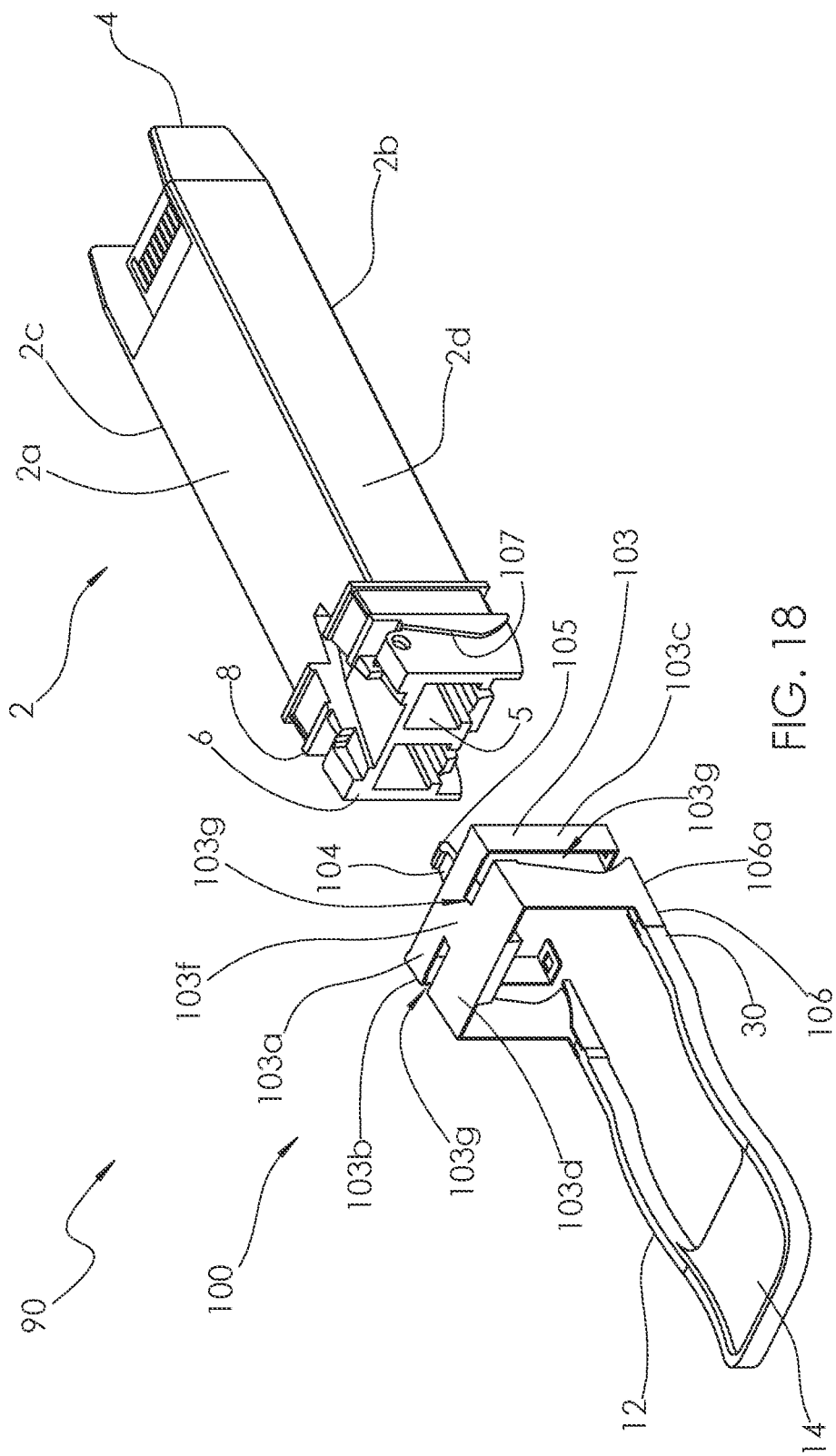
FIG. 18 is a bottom perspective view of the pluggable transceiver module shown in FIG. 14 showing the latching/delatching mechanism decoupled from and spaced apart from the module body to show features of the latching/delatching mechanism.
Figure 19:
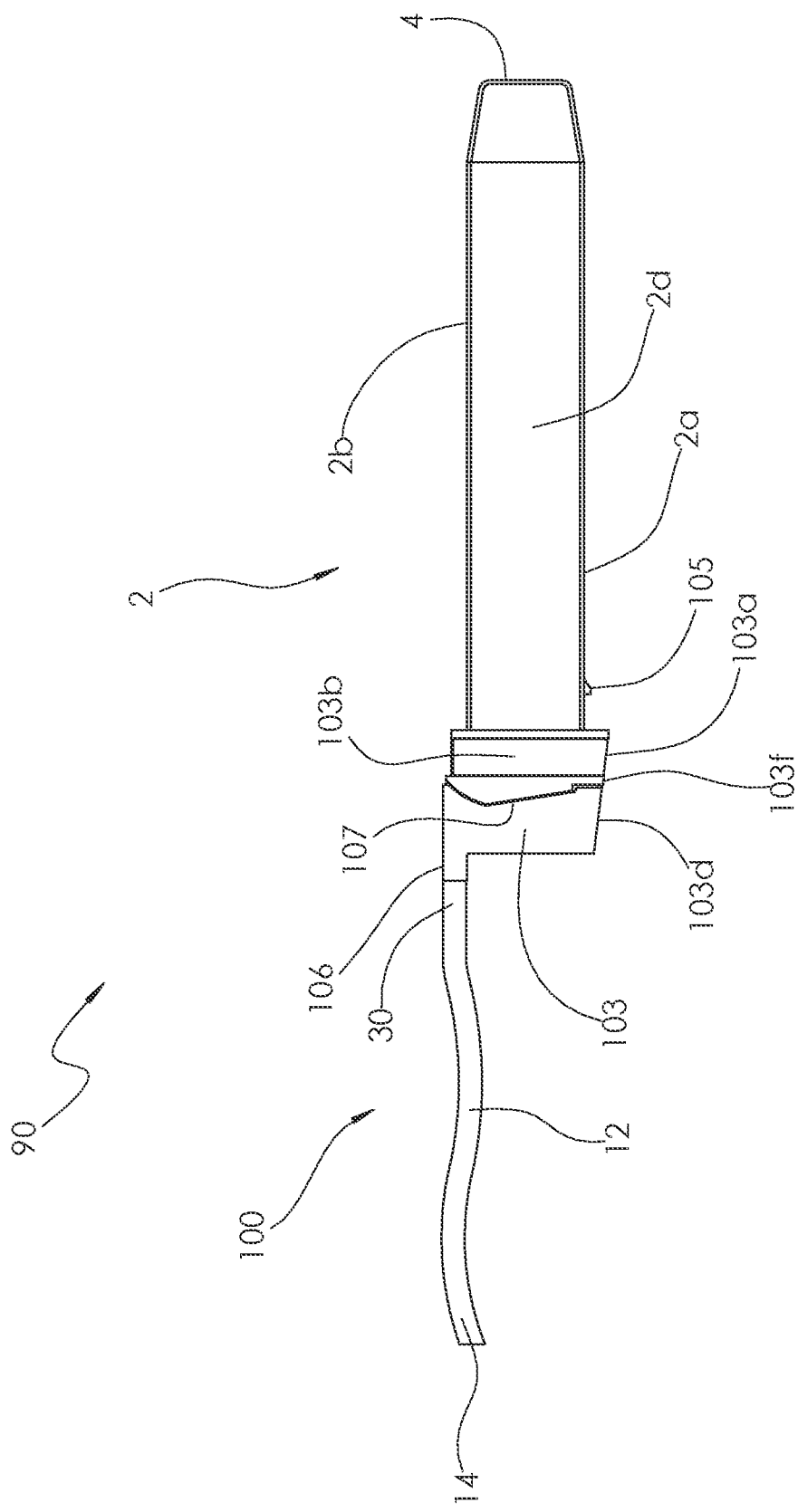
FIG. 19 is a side elevation view of the pluggable transceiver module shown in FIG. 14 with the latching/delatching mechanism in the latched state.
Figure 20:
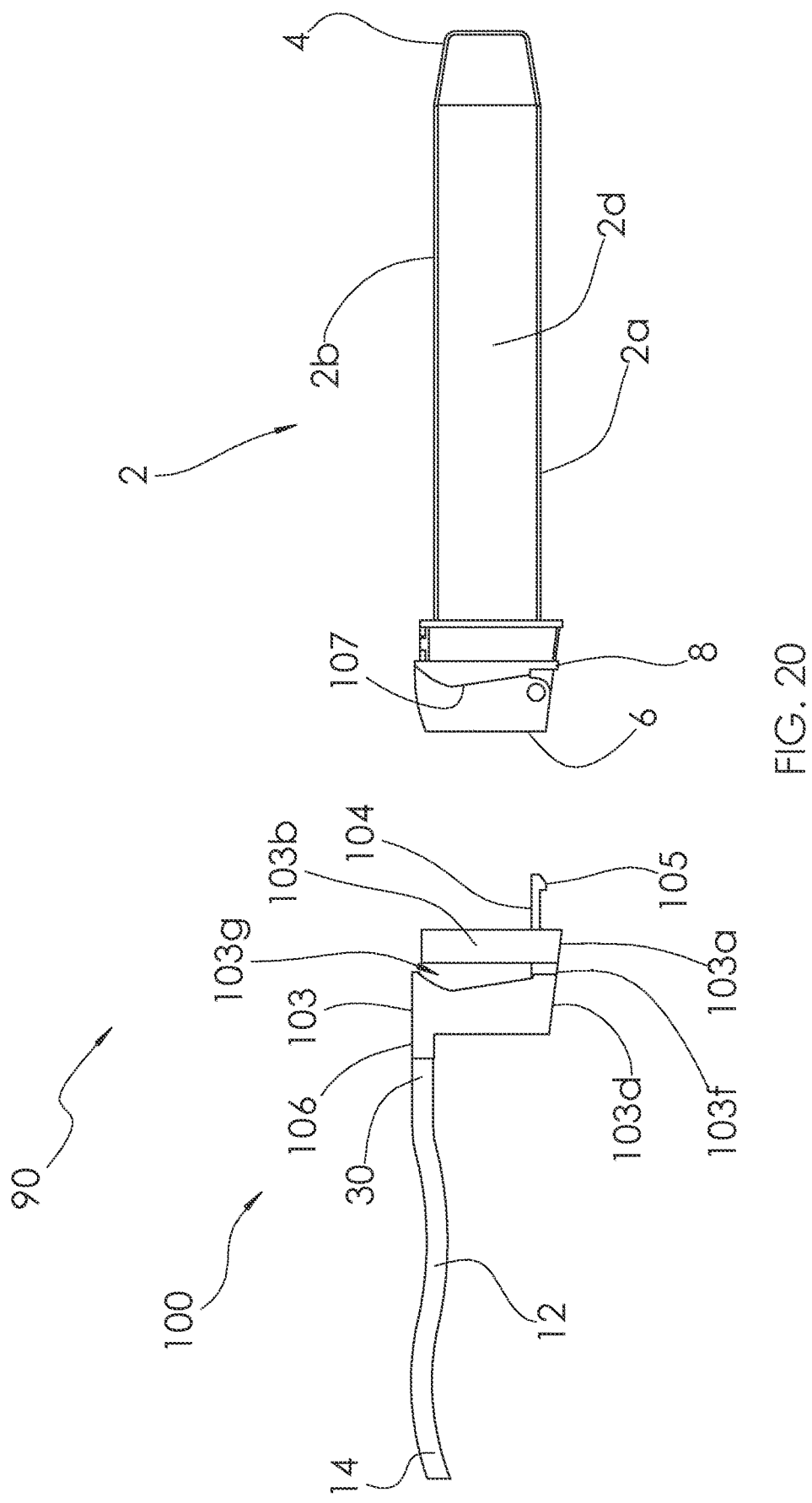
FIG. 20 is a side elevation view of the pluggable transceiver module shown in FIG. 14 with the latching/delatching mechanism decoupled from and spaced apart from the module body to show features of the latching/delatching mechanism.
Figure 21:
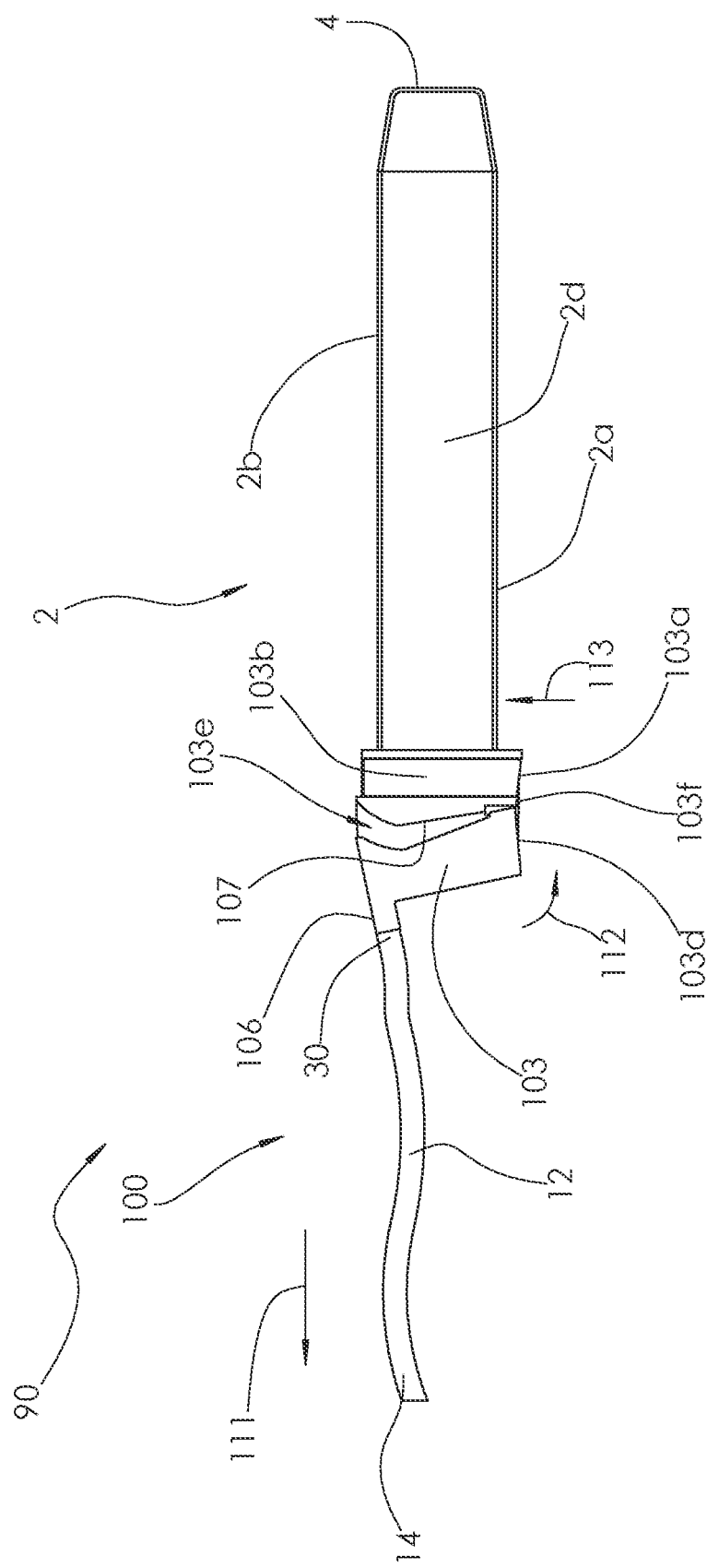
FIG. 21 is a side elevation view of the pluggable transceiver module shown in FIG. 14 with the latching/delatching mechanism in the delatched state.

FIG. 14 is a top perspective view of the pluggable transceiver module 90 with the latching/delatching mechanism 100 secured to the module body 2 and in the latched position, or state. FIG. 15 is a top perspective view of the pluggable transceiver module 90 shown in FIG. 14 showing the latching/delatching mechanism 100 in the delatched position, or state. FIG. 16 is a top perspective view of the pluggable transceiver module 90 shown in FIG. 14 showing the latching/delatching mechanism 100 decoupled from and spaced apart from the module body 2 to show features of the latching/delatching mechanism 100. FIG. 17 is a bottom perspective view of the pluggable transceiver module 90 shown in FIG. 14 showing the latching/delatching mechanism 100 secured to the module body 2 and in the latched position, or state. FIG. 18 is a bottom perspective view of the pluggable transceiver module 90 shown in FIG. 14 showing the latching/delatching mechanism 100 decoupled from and spaced apart from the module body 2 to show features of the latching/delatching mechanism 100. FIG. 19 is a side elevation view of the pluggable transceiver module 90 shown in FIG. 14 with the latching/delatching mechanism 100 in the latched state. FIG. 20 is a side elevation view of the pluggable transceiver module 90 shown in FIG. 14 with the latching/delatching mechanism 100 decoupled from and spaced apart from the module body 2 to show features of the latching/delatching mechanism 100. FIG. 21 is a side elevation view of the pluggable transceiver module 90 shown in FIG. 14 with the latching/delatching mechanism 100 in the delatched state.

In accordance with this representative embodiment, a release structure 103 of the latching/delatching mechanism 100 has a release arm 104 (FIG. 18) that is similar to the release arm 84 of the latching/delatching mechanism 80 shown in FIGS. 7-13. The feet 30 disposed on the ends of the respective release tab arms 12a and 12b are mechanically coupled to the release structure 103. The feet 30, which can be made of flexible plastic, fit under and into pockets 106a formed in the release structure 103 at connection points 106 on the release structure 103. The pockets 106a correspond to gaps formed in top overhanging portions 106b of the top surface of the release structure 103. By keeping the release tab 12 secured to the release structure 103 at connection points 106, the module body 2 can be inserted into and extracted from a computer connection port by applying appropriate push and pull forces, respectively, to the pull tab 12 in the manner described above with reference to FIGS. 1-6.

In addition to having the release arm 104, the release structure 103 also has a crossmember 103a and first and second side members 103b and 103c, respectively. The crossmember 103a acts as the spring member. A connecting portion 103f mechanically couples the spring member 103a to a forward portion 103d of the release structure 103. The forward portion 103d is otherwise separated from the crossmember 103a by slots 103g formed in the release structure 103 on opposite sides of the connecting portion 103f. The slots 103g also extend along the opposite sides of the release structure 103 to separate the side members 103b and 103c of the release structure 103 from the forward portion 103d of the release structure 103. The portions of the slots 103g extending along the opposite sides of the release structure 103 are complimentary in shape to stop features 107 formed on opposite sides of the connection surface 6 of the module body 2.

The forward portion 103d of the release structure 103 is mechanically coupled with, or joined to, the proximal end of the release arm 104. In accordance with a representative embodiment, the release structure 103 is formed as a unitary piece part of sheet metal, although it could be made of multiple piece parts and could be made of other materials.

Distal ends of the side members 103b and 103c are anchored to the module body 2, thereby securing the release structure 103 to the module body 2.

The pluggable module 90 operates in a manner similar to the manner in which the pluggable module 1 operates. The default position, or state, of the latching/delatching mechanism 100 is the latched position shown in FIGS. 14, 17 and 19. In this position, the locking post 105 protrudes outwardly away from the surface 2a to engage a latch structure disposed on the inside of the computer connection port, or cage. In this position, the shape of the slot 103g ensures that side surfaces of the forward portion 103d of the release structure 103 are in abutment with stop features 17 of the module body 2. When a pull force is exerted on the crossmember 14 of the release tab 12 in the direction generally indicated by arrow 111 in FIG. 14, the widths of the portions of the slots 103g extending along the opposite sides of the release structure 103 begin to widen as the side surfaces of the forward portion 103d of the release structure 103 begin to move away from the stop features 107 of the module body 2, as shown in FIGS. 15 and 21. The pull force exerted on the release tab 12 in direction 111 is converted into a rotational force exerted on the spring member 103a of the release structure 103 due to the connecting portion 103f of the release structure 103 that couples the forward portion 103d of the release structure 103 with the crossmember 103a of the release structure 103.

A proximal end of the release arm 104 is coupled to, or joined with, the forward portion 103d of the release structure 103 such that rotation of the forward portion 103d of the release structure 103 in the direction indicated by arrow 112 in FIG. 21 results in rotation of the proximal end of the release arm 104 by the same angle. Because the locking post 105 is disposed on the distal end of the release arm 104, rotation of the proximal end of the release arm 104 in the direction indicated by arrow 112 in FIG. 21 causes the locking post 105 to move in the opposite direction, i.e., to be retracted inwardly away from the surface 2a of the module body in the direction of arrow 113 in FIG. 21. In this unlocked position of the locking post 105, it no longer engages the latch structure disposed on the inside of the computer connection port, or cage, which allows the module body 2 to be extracted from the computer connection port by continued exertion of the pulling force on the release tab 12 in the direction of arrow 111 in FIG. 21.

Like the latching/delatching mechanisms 10 and 80, the latching/delatching mechanism 100 has a spring-loaded configuration that rotationally biases the latching/delatching mechanism 100 back toward the latched position if the pulling force in the direction of arrow 111 in FIG. 21 is removed when the forward portion 103e is rotated to the angular position shown in FIG. 21 or to a lesser angular degree than that shown in FIG. 21. This is because rotation of the forward portion 103d causes stress or strain to be placed on the spring member. This strain restores the crossmember 103a to its unbent or unstrained state when the pull force is removed, thereby returning the latching/delatching mechanism 100 to its latched state shown in FIG. 19.

As with the spring-loading configurations discussed above with reference to the embodiments of FIGS. 1-13, the spring-loading configuration comprising spring member 103a according to this representative embodiment is integrated into the release structure 103, which allows the release structure 103 to be made as a single piece part design rather than as separate piece parts that are coupled together. Accordingly, the release structure 103 can involve fewer distinct parts and can be easier to manufacture, assemble, install, and upgrade compared to known transceiver modules that incorporate spring-loading into the latching/delatching mechanism by using multiple separate spring-loading components.

The release structure 103 having the integrated spring-loading configuration may be configured for use with a wide variety of transceiver modules including, for example, QSFP-type modules including QSFP, QSFP+, QSFP14, QSFP28, QSFP56, QSFP-DD, and µQSFP modules, SFP-type modules including, for example, SFP, SFP+, and SFP28 modules, and, C form factor type modules including, for example, CFP, CFP2, and CFP4 modules.

A variety of spring-loading configurations for the latching/delatching mechanism 100 can be used for this purpose. The configuration described above with reference to FIGS. 14-21 is one example of a suitable configuration, but many others are also possible, as will be understood by those of skill in the art in view of the description provided in the present disclosure.

Figure 22:
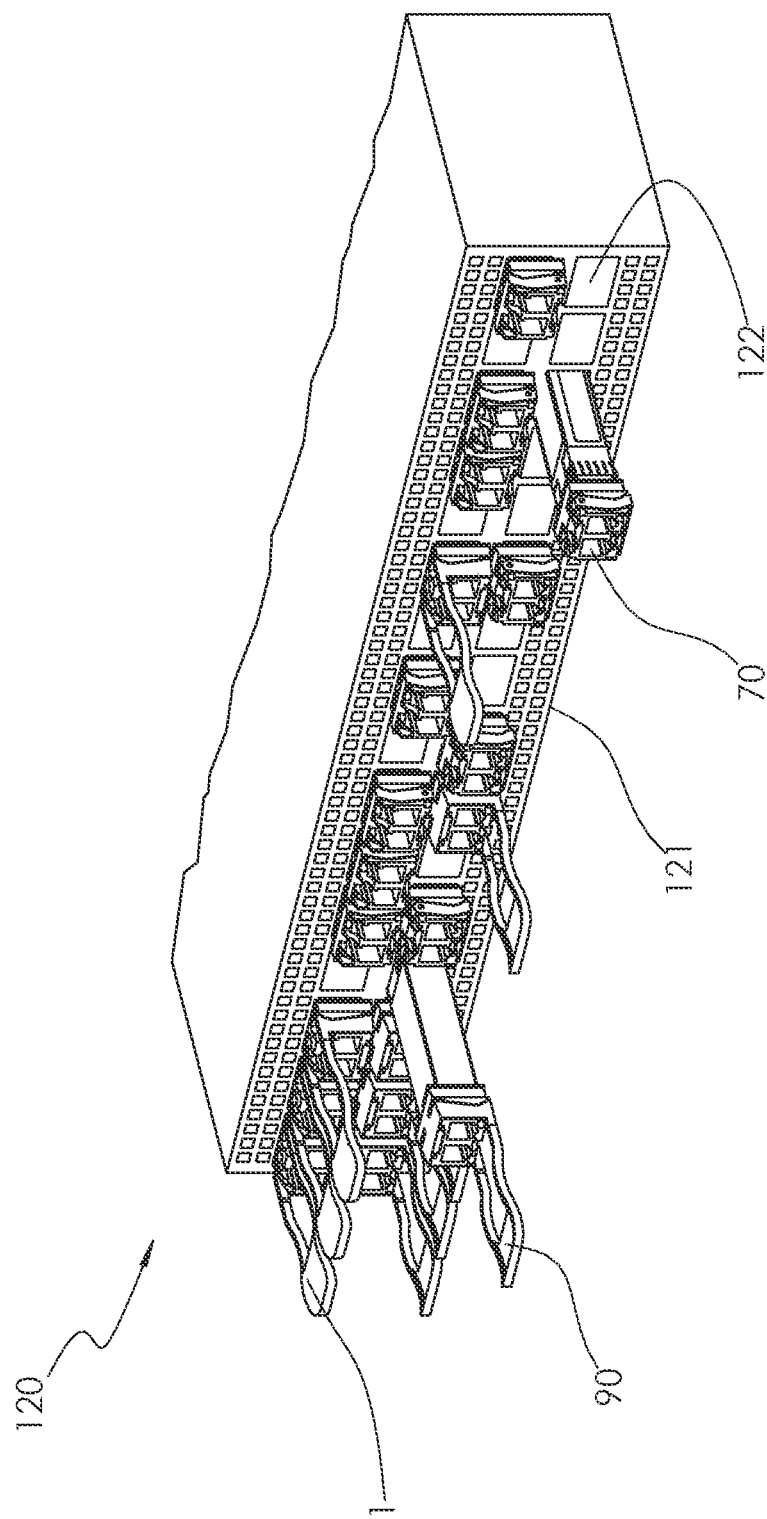
FIG. 22 is a top perspective view of one example of a system comprising a system housing having a plurality of computer connection ports arranged in two rows in which a plurality of pluggable transceiver modules shown in FIGS. 1, 7 and 14 are disposed.

FIG. 22 displays one example of a system 120 comprising a system housing 121 having a plurality of computer connection ports 122 arranged in two rows in which a plurality of pluggable transceiver modules 1, 70 and 90 are disposed. The computer connection port shown in this example is just one type of connection port that is compatible with the pluggable transceiver modules of the present disclosure. Other compatible computer connection ports include QSFP type ports, for example, a QSFP, QSFP+, QSFP14, QSFP28, QSFP56, QSFP-DD, or µQSFP, SFP type ports, for example, a SFP, SFP+, or SFP28, a Small Form Factor (SFF) casing, OSFP type ports, C form factor type ports, for example, CFP, CFP2, or CFP4, and other computer connection ports configured to receive electrical or optical connectors. Similarly, the pluggable transceiver module shown in this example is just one type example of the transceiver modules included in this invention. Other transceiver examples include QSFP type modules including QSFP, QSFP+, QSFP14, QSFP28, QSFP56, QSFP-DD, and µQSFP modules, SFP type modules including SFP, SFP+, and SFP28 modules, and, C form factor type modules including, CFP, CFP2, and CFP4 modules.

FIG. 22 illustrates the module density typically seen in today's state of the art digital communications switches, servers, and routers. The multiple rows of tightly packed optical transceiver modules demonstrate the need for the space efficient release mechanisms described herein. By minimizing the amount of rotational and lateral movement needed to actuate the release structure, the latching/delatching mechanisms of the present disclosure encourage higher information bandwidth by supporting digital communication systems with increased module density. Additionally, the release tab 12, 81 of the present disclosure make module extraction from a high-density port system similar to the one shown in FIG. 22 more practical. By providing an easy-to-grasp, separate structure extended out from the connection ports, the release tabs make the release structure more accessible by alleviating the need to reach in-between the modules and connection ports to actuate the release structure, for example, by rotating a bail or pulling a crossmember on the module housing.

It should be noted that the illustrative embodiments have been described with reference to a few embodiments for the purpose of demonstrating the principles and concepts of the invention. Persons of skill in the art will understand how the principles and concepts of the invention can be applied to other embodiments not explicitly described herein. For example, while particular configurations of the pluggable transceiver module are described herein and shown in the figures, a variety of other configurations such as those mentioned above can be used, as will be understood by those skilled in the art in view of the description provided herein. Many other modifications may be made to the embodiments described herein while still achieving the goals of the invention, and all such modifications are within the scope of the invention.

What is claimed is:

1. A pluggable transceiver module comprising:
a module body having a first end portion configured to mate with a computer connection port and a second end portion opposite the first end portion having a module connection port configured to mate with a connector;
a latching/delatching mechanism comprising:
a release structure mechanically coupled to the second end portion of the module body, the release structure comprising a main body, at least one release arm and at least one spring member, a proximal portion of the release arm being coupled to the main body, a distal portion of the release arm extending away from the main body toward the module body;
the at least one spring member comprising two side members extending away from a cross member, the cross member supporting the at least one release arm; the at least one spring member having a square u-shaped geometry formed by the two sides members and the cross member;
a release tab having a first end that is mechanically coupled to at least one of the main body of the release structure and the second end portion of the module body, the release tab having a second end disposed to be contacted by a user to move the latching/delatching mechanism between a latched position and a delatched position, wherein moving the latching/delatching mechanism from the latched position to the delatched position causes the release arm to change a position of a locking post relative to a latch structure of the computer connection port from a locked position in which the locking post is engaged with the latch structure to an unlocked position in which the locking post is disengaged from the latch structure to allow the module body to be extracted from the computer connection port;
and wherein said at least one spring member biases the latching/delatching mechanism toward the latched position when the latching/delatching mechanism is being moved from the latched position toward the delatched position.

2. The pluggable transceiver module of claim 1, wherein said at least one spring member is integrally formed in the release structure.

3. The pluggable transceiver module of claim 2, wherein the release tab comprises a bail that is rotatable from a latched position to a delatched position to move the latching/delatching mechanism from the latched position to the delatched position, respectively, the bail having first and second side members that are substantially parallel to one another and a cross member that is substantially perpendicular to the first and second side members, wherein proximal ends of the first and second side members are joined to opposite ends of the crossmember, and wherein distal ends of the first and second side members are rotatably coupled to at least one of the release structure and the module body.

4. The pluggable transceiver module of claim 3, wherein said at least one spring member temporarily deforms as the bail is rotated from the latched position toward the delatched position, and wherein if a pull force that is exerted by a user on the crossmember of the bail to rotate the bail from the latched position toward the delatched position is removed, the spring restores to a substantially original shape thereby causing the latching/delatching mechanism to return to the latched position.

5. The pluggable transceiver module of claim 4, wherein a default position of the locking post is the locked position of the locking post.

6. The pluggable transceiver module of claim 4, wherein rotation of the bail from the latched position to the delatched position operates a cam/cam follower arrangement that creates the temporarily deformation in the portions of the release structure comprising said at least one spring member.

* * * * *